United States Patent
Apte et al.

(10) Patent No.: US 12,265,921 B2
(45) Date of Patent: Apr. 1, 2025

(54) MILESTONE PREDICTION OF FUEL AND CHEMICAL USAGE

(71) Applicant: Deere & Company, Moline, IL (US)

(72) Inventors: Ashish Apte, Pune (IN); Arikatla Vishnu Vardhan Reddy, Kurnool (IN); Vishal Dobariya, Jasdan (IN); Pallavi Bhargava, Dhar (IN); Hrishikesh H Tupe, Pune (IN)

(73) Assignee: DEERE & COMPANY, Moline, IL (US)

( * ) Notice: Subject to any disclaimer, the term of this patent is extended or adjusted under 35 U.S.C. 154(b) by 968 days.

(21) Appl. No.: 17/342,198

(22) Filed: Jun. 8, 2021

(65) Prior Publication Data

US 2022/0391721 A1 Dec. 8, 2022

(51) Int. Cl.
 *G06N 5/04* (2023.01)
 *G06N 20/00* (2019.01)
 *G07C 5/00* (2006.01)

(52) U.S. Cl.
 CPC .............. *G06N 5/04* (2013.01); *G06N 20/00* (2019.01); *G07C 5/004* (2013.01)

(58) Field of Classification Search
 CPC ........ G05D 1/0221; A01C 7/04; A01C 7/081; A01C 7/102; B62D 15/0265; A01B 79/005; A01M 7/0092
 See application file for complete search history.

(56) References Cited

U.S. PATENT DOCUMENTS

| 5,913,917 A | 6/1999 | Murphy | |
|---|---|---|---|
| 6,609,468 B1 * | 8/2003 | Meyer | A01C 7/081 111/177 |

(Continued)

FOREIGN PATENT DOCUMENTS

| CN | 103608855 A | 2/2014 |
|---|---|---|
| CN | 108061584 A | 5/2018 |

(Continued)

OTHER PUBLICATIONS

Extended European Search Report and Written Opinion issued in European Patent Application No. 22174730.6, dated Apr. 14, 2023, in 12 pages.

(Continued)

*Primary Examiner* — Yuri Kan
(74) *Attorney, Agent, or Firm* — HANLEY, FLIGHT & ZIMMERMAN, LLC

(57) ABSTRACT

Methods, apparatus, systems and articles of manufacture are disclosed for milestone prediction of fuel and chemical usage. An example apparatus includes one or more memories comprising computer readable instructions; one or more processors to execute the computer readable instructions to determine a current amount of fuel required without halt and a current fuel consumption rate for a machine during a harvesting event in a field based on a first amount of fuel required without halt, a first fuel consumption rate, and real time information from sensors of the machine, and determine a real time amount of fuel required based on the current amount of fuel required without halt, the current fuel consumption rate, and a halt time for the machine during the harvesting event, the one or more processors to use the real time amount of fuel required to schedule fuel delivery for the machine.

20 Claims, 20 Drawing Sheets

(56) References Cited

U.S. PATENT DOCUMENTS

| | | | |
|---|---|---|---|
| 6,688,244 B1* | 2/2004 | Meyer | A01C 7/081 111/177 |
| 7,025,010 B2* | 4/2006 | Martin | A01C 7/081 111/175 |
| 9,179,594 B2* | 11/2015 | Graham | A01C 7/04 |
| 10,008,052 B2 | 6/2018 | Wilson et al. | |
| 10,071,647 B2 | 9/2018 | Dalum | |
| 10,921,171 B2 | 2/2021 | Kremmer et al. | |
| 2007/0048434 A1* | 3/2007 | Mayerle | A01C 7/102 427/8 |
| 2012/0029803 A1 | 2/2012 | Yasushi et al. | |
| 2013/0311050 A1* | 11/2013 | Cash | A01B 79/005 701/50 |
| 2014/0257911 A1 | 9/2014 | Anderson | |
| 2014/0278696 A1 | 9/2014 | Anderson | |
| 2016/0146611 A1 | 5/2016 | Matthews | |
| 2018/0132422 A1 | 5/2018 | Hassanzadeh et al. | |
| 2019/0129430 A1* | 5/2019 | Madsen | B62D 15/0265 |
| 2019/0129435 A1 | 5/2019 | Madsen et al. | |
| 2019/0145789 A1 | 5/2019 | Li et al. | |
| 2019/0294150 A1 | 9/2019 | Klubertanz et al. | |

FOREIGN PATENT DOCUMENTS

| | | | |
|---|---|---|---|
| DE | 102019215578 A1 | 5/2020 | |
| EP | 3278650 | 2/2018 | |
| EP | 3278650 A1 | 2/2018 | |
| FR | 3003187 A1 * | 9/2014 | A01M 7/0092 |
| JP | 6226202 | 11/2017 | |
| JP | 6226202 B2 | 11/2017 | |
| RU | 2012140260 | 3/2014 | |
| RU | 2012140260 A | 3/2014 | |
| WO | WO 2010113246 A1 | 10/2012 | |
| WO | WO 2010116481 A1 | 10/2012 | |
| WO | WO2017159801 A1 | 9/2017 | |
| WO | 2019032648 | 2/2019 | |
| WO | WO 2019032648 A1 | 2/2019 | |

OTHER PUBLICATIONS

European Search Report issued in European Patent Application No. 22174730.6, dated Nov. 8, 2022, 13 pages.

* cited by examiner

MILESTONE PREDICTION OF FUEL AND CHEMICAL USAGE

FIELD OF THE DISCLOSURE

This disclosure relates generally to vehicle fuel and chemical usage, and, more particularly, to milestone prediction of fuel and chemical usage.

BACKGROUND

In recent years, agricultural vehicles/machines have become increasingly automated. Agricultural machines may semi-autonomously or fully-autonomously drive and perform operations on fields. Agricultural machines perform operations using, for example, planting implements, spraying implements, harvesting implements, fertilizing implements, strip/till implements, etc. These autonomous agricultural machines include multiple sensors (e.g., Global Navigation Satellite System (GNSS), Global Positioning Systems (GPS), etc.) to help navigate without the assistance, or with limited assistance, from human users. In order for agricultural machines to perform the operations using the various implements, the agricultural machines require certain amounts of resources to complete the operations (e.g., fuel for the vehicle/machine, amounts of chemicals for spraying implements, amounts of seeds for planting/seeding implements, etc.).

Figure 1:
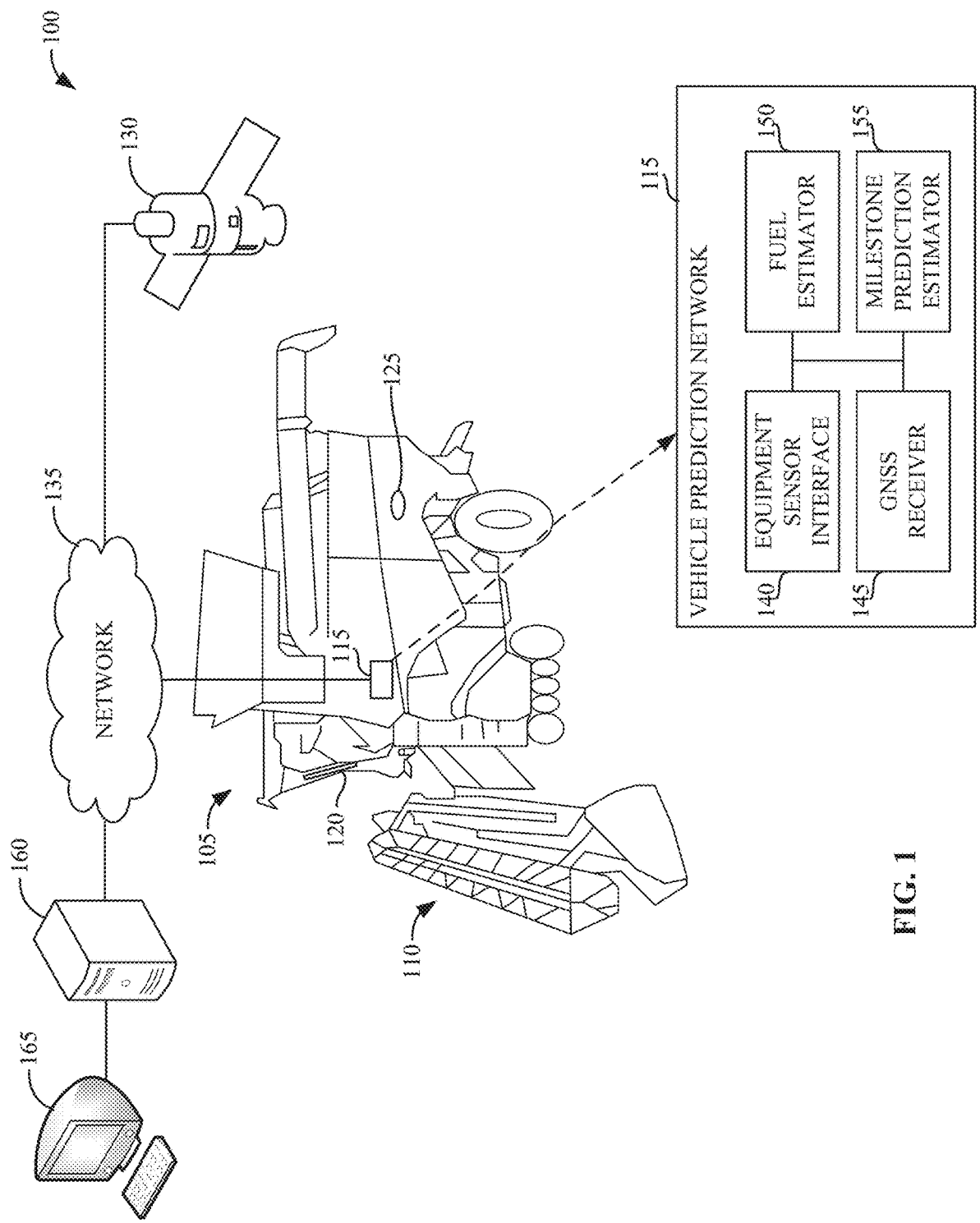
FIG. 1 is a schematic illustration of an example environment in which teachings of this disclosure may be implemented.

The figures are not to scale. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

Agricultural vehicles/machines perform operations using, for example, planting implements, spraying implements, harvesting implements, fertilizing implements, strip/till implements, etc. In order for agricultural machines to perform the operations using the various implements, the agricultural machines require certain amounts of resources to complete the operations (e.g., fuel for the machine, amounts of chemicals for spraying implements, amounts of seeds for planting/seeding implements, etc.). Operators of agricultural machines typically try to plan for the amounts of resources (e.g., fuel, seeds, chemicals, etc.) that will be needed for operations on different fields. Typically, operators need to know the amount needed before performing an operation in a field. In some circumstances, operators need to know the amounts of the resources in real time to make adjustments to the plan for completing the operation in the field. Typically, determining the amounts of resources needed by the agricultural machine for field operations before and during the operation help to reduce downtime of the agricultural machine due to fuel shortage and/or other resource shortage (e.g., spray chemical, seeds, etc.), which help to reduce cost for the operation.

Conventional methods for estimating fuel usage/delivery for an agricultural machine use historic field data to estimate the fuel consumption before starting the agricultural operation. For example, conventional methods may obtain historic field data (e.g., the size of the field, the agricultural operation being performed, the fuel needed to traverse the field in the past, etc.) for a specific field that has been chosen for the agricultural operation. The conventional methods use the historic field data to determine estimates for fuel usage during an agricultural operation. However, examples disclosed herein not only use historic field data, but also use remotely sensed data in real time. Since the conventional methods use historic data of the same field for estimation. The conventional methods do not account for current field conditions, which can cause the estimation to not be accurate for the current operation. Examples disclosed herein estimate fuel required with the field data collected at the time of operation to provide more accurate fuel estimation.

Examples disclosed herein include calculating fuel estimation for fuel delivery scheduling before going to a field using remotely sensed data. Examples disclosed herein obtain aerial images of the field to calculate yield, area of operation, number of turns, terrain structure, etc. for the field of operation. In some examples, the aerial images of the field may be obtained from satellite data and/or data from an unmanned aerial vehicles (e.g., a drone). Examples disclosed herein use the information calculated from the aerial images to calculate fuel consumption using machine learning models. Examples disclosed herein use past operation data (e.g., historic data) to train the machine learning models, which develop the relation between the field data and the fuel consumed during operation. Examples disclosed herein use a run time machine learning model to estimate the fuel consumption with determined number of stops, turn speed, and engine load during stops along with other parameters from real time data during the operation of the agricultural machine.

Examples disclosed herein determine the total fuel requirement before the start of agricultural operation. Examples disclosed herein also update the fuel requirement in real time based on the actual field conditions determined from the machine sensors and aerial image data. Examples disclosed herein use machine learning models to determine the fuel consumption rate and the total operation time to estimate the fuel requirement for the entire field. In examples disclosed herein, the total operation time depends on the area of field, type of operation, total throughput, number of turns, turning time, number of stoppages, stoppage time, etc. In examples disclosed herein, the fuel consumption rate depends on engine load profile, wherein the engine load profile of an agricultural machine depends on the characteristic of the working machine, the configuration of the machine, the operating speed, types of crop and the conditions, the type of operation, total throughput, topography, etc. Examples disclosed herein regulate the engine load at a given setpoint.

Additionally, during a machine in transport mode or during a farm/agriculture operation, an operator finds it difficult to predict at what time or distance resources/materials present on the machine for the field operation will be empty (e.g., a chemical present in a tank, seeds present in a tank, etc.). Typically, a field includes multiple regions that have different soil content, crop, variety, etc. In such examples, field prescriptions are used to disperse the resource (e.g., spray the chemical, spread seeds, etc.) at different rates depending on the different characteristics of the field (e.g., soil content, crop, etc.) in different locations. For example, a field may include several regions that have different characteristics, and each of these regions have defined prescriptions for releasing a resource in that region (e.g., a rate for release, a speed for the vehicle, etc.). In examples disclosed herein, the prescriptions are used to adjust dispersal of resources (e.g., chemical, seeds, slurry, etc.) in a field based on the conditions/characteristics of regions within the field.

Examples disclosed herein estimate milestone prediction for the emptying of resources (e.g., fuel, chemical, seeds, slurry, etc.) from an agriculture machine. Examples disclosed herein use machine sensor information, prescription information for the field of operation, and the vehicle heading to determine milestones on a projected path of the machine that identify predictions for how much of the resource will be available at that point, a time until the resource tank is empty, etc. Conventional methods for calculating an approximate time to empty are based on current machine sensor data for the rate of usage and tank volume. Examples disclosed herein calculate time to empty and distance to empty at various points (milestones) in the field based on the sensors data along with the prescription information and vehicle heading.

Examples disclosed herein predict/estimate milestones for resource usage for different field operations. Examples disclosed herein predict milestones for time to empty for spraying chemicals, fuel usage, etc. Examples disclosed herein also predict milestones for distance to empty for slurry applicators. For the use case of slurry applicator, the slurry applicator does not have control over a variable rate for applying the slurry to the field. Examples disclosed herein may use a manure constituent sensing (MCS) control and prescription information that identify the machine speed for different regions of the field to vary the amount of slurry/manure applied to the field. Examples disclosed herein also predict milestones for distance to empty for planters and seeders. Examples disclosed herein provide milestone prediction for crop care (sprayers, spreaders), harvest lab manure sensing based slurry applicators, planting/seeding and any implements supporting these operations to improve planning of the field operation to reduce the likelihood of running out of a resource needed for the field operation. Examples disclosed herein reduce the downtime of an agriculture machine by predicting how much of a resource (e.g., fuel, chemical, seed, etc.) is needed for a field both before and during operation.

FIG. 1 is a schematic illustration of an example environment 100 in which teachings of this disclosure may be implemented. The example environment 100 includes an example machine 105, an example implement 110, an example vehicle prediction network 115, an example user interface 120, example sensors 125, an example satellite 130, and an example network 135. The example vehicle prediction network 115 further includes an example equipment sensor interface 140, an example Global Navigation Satellite System (GNSS) receiver 145, an example fuel estimator 150, an example milestone prediction estimator 155, an example server 160, and an example computer 165.

In the illustrated example of FIG. 1, the example machine 105 is an agriculture vehicle/machine (e.g., a tractor, front loader, harvester, cultivator, or any other suitable vehicle) configured to perform a field operation (e.g., spraying a chemical, spreading slurry, planting seeds, harvesting crops, etc.). In the illustrated example, the machine 105 includes the example implement 110 to perform the field operation. For example, the implement 110 can be a slurry applicator, a planter/seeder, a spraying/spreading implement, etc. In examples disclosed herein, machine 105 is equipped with the vehicle prediction network 115 to predict/estimate fuel usage, time/distance to empty for fuel and/or the resource of the field operation (e.g., a chemical, seeds, slurry, etc.), etc. The example vehicle prediction network 115 is explained in further detail with respect to the components in the vehicle prediction network 115.

In the illustrated example of FIG. 1, the example user interface 120 included in the example machine 105 is an interactive display in which a user/operator may select and/or enter desired inputs (e.g., select a screen display, select a desired prediction system, enter desired vehicle speed, enter implement working width, power on and/or off the vehicle, etc.) before, during, and/or after operation of the machine 105. For example, a user/operator may indicate to the vehicle prediction network 115, via the user interface 120, that fuel estimation is desired (e.g., may indicate to initiate the fuel estimation). In such an event, the vehicle prediction network 115 initiates a series of prompts and/or otherwise options for the user/operator to select and input information for estimating the fuel. In another example, a user/operator may indicate to the vehicle prediction network 115, via the user interface 120, that milestone prediction is desired (e.g., may indicate to initiate the milestone prediction for a resource included in the machine 105). In such an event, the vehicle prediction network 115 initiates a series of prompts and/or otherwise options for the user/operator to select and input information for predicting the milestones. For example, the user interface 120 may display a prompt requesting the user/operator to input the working width of the example implement 110. In examples disclosed herein, the user interface 120 communicates with the vehicle prediction network 115 to relay and/or receive user inputs, display predictions/estimation determined by the vehicle prediction network 115, etc. In some examples disclosed herein, the user interface 120 is a liquid crystal display (LCD) touch screen such as a tablet, a Generation 4 CommandCenter™ Display, a computer monitor, etc.

In the illustrated example of FIG. 1, the example sensors 125 included in the example machine 105 collect measurements from the example machine 105. In some examples, the sensors 125 include velocity sensors and inertial sensors (e.g., accelerometers, gyroscopes, magnetometers, etc.) to measure linear acceleration, rotation rate, heading reference (e.g., the angular direction the nose of the machine is facing), etc. and determine the speed and/or direction of the machine 105. In some examples, sensors 125 include a wheel direction sensor that senses the position and/or angle in which a wheel of the machine 105 (e.g., a rear wheel and/or a front wheel) is placed to determine if the machine 105 is turning. In some examples, the sensors 125 include engine sensor that sense fuel usage. In some examples, the sensors 125 also includes sensors for the example implement 110. For example, if there is a tank associated with the implement, the sensors 125 may include sensors to determine the current volume of the tank, the rate at which the tank is releasing materials, etc. Additionally, in other examples disclosed herein, the sensors 125 may include any suitable sensor on the machine 105 such as a proximity sensor, wheel rotation per minute (RPM) sensor, a LIDAR sensor, etc. In examples disclosed herein, the sensors 125 communicate with the vehicle prediction network 115 via the example equipment sensor interface 140 to provide the data of the machine 105. In some examples, the sensors 125 may be located in and/or on any suitable section of the machine (e.g., the front of the machine 105, the roof of the machine 105, near the driver side, near the passenger side, etc.).

In the illustrated example of FIG. 1, the example satellite 130 provides aerial information to the example vehicle prediction network 115 included in the machine 105. In some examples, the satellite 130 captures aerial images of fields. In some examples, the satellite 130 provides geo-spatial positioning information to the example GNSS receiver 145 included in the vehicle prediction network 115. In some examples, the satellite 130 provides the aerial images of the fields to the vehicle prediction network 115 via the example network 135. In some examples, the satellite 130 may be included in a network of satellites.

In the illustrated example of FIG. 1, the example equipment sensor interface 140 obtains sensor(s) data from the example sensors 125 included in the machine 105. The example equipment sensor interface 140 communicates with the sensors 125 to obtain data representative of the velocity, direction, fuel usage, tank volume, material release rate, etc. of the machine 105. In some examples disclosed herein, the equipment sensor interface 140 may communicate via any suitable wired and/or wireless communication method to obtain machine 105 sensor data from the sensors 125. In examples disclosed herein, the equipment sensor interface 140 transmits the sensor(s) data of the machine 105 to the example fuel estimator 150 and the example milestone prediction estimator 155.

The example GNSS receiver 145 obtains the current geographical location of the machine 105. In the example of FIG. 1, the GNSS receiver 145 is a GPS receiver. In other examples disclosed herein, the GNSS receiver 145 may be any suitable geo-spatial positioning receiver. In some examples, the GNSS receiver 145 obtains the current geographical location from the satellite 130. In some examples, the GNSS receiver 145 samples the geographical location of the machine 105 at a threshold interval. For example, every 0.1 seconds, the GNSS receiver 145 may obtain the geographical location of the machine 105. In examples disclosed herein, the GNSS receiver 145 transmits the geographical location data of the machine 105 to the example fuel estimator 150 and the example milestone prediction estimator 155.

In the illustrated example of FIG. 1, the example fuel estimator 150 performs fuel estimation for the machine 105. The example fuel estimator 150 obtains aerial images of the field from the example satellite 130 to calculate yield, area of operation, number of turns, terrain structure, etc. for the field of operation. The example fuel estimator 150 uses the information calculated from the aerial images to calculate fuel consumption using machine learning models. The example fuel estimator 150 uses past operation data (e.g., historic data) to train the machine learning models, which develop the relation between the field data and the fuel consumed during operation. The example fuel estimator 150 uses a run time machine learning model to estimate the fuel consumption with determined number of stops, turn speed, and engine load during stops along with other parameters from real time data during the operation of the agricultural machine. The example fuel estimator 150 is described in further detail below in connection with FIGS. 2-4.

In the illustrated example of FIG. 1, the example milestone prediction estimator 155 performs milestone prediction for the machine 105. The example milestone prediction estimator 155 estimates milestone prediction for the emptying of resources (e.g., chemical, seeds, slurry, etc.) from the machine 105. The example milestone prediction estimator 155 uses machine sensor information from the example equipment sensor interface 140, prescription information for the field of operation, and the vehicle heading to determine milestones on a projected path of the machine 105 that identify predictions for how much of the resource will be available at that milestone, a time until the resource tank is empty at that milestone, etc. Examples disclosed herein predict milestones for resource usage for different field operations (e.g., spreading, spraying, slurry applicator, planting/seeding, etc.). The example milestone prediction estimator 155 is described in further detail below in connection with FIG. 5.

In the illustrated example of FIG. 1, the example fuel estimator 150 and the example milestone prediction estimator 155 operate in the example vehicle prediction network 115 on the machine 105. However, in other examples, at least one of the fuel estimator 150 and/or the milestone prediction estimator 155 may operate on a cloud via the example server 160 and/or computer 165. In some examples, the fuel estimator 150 and/or the milestone prediction estimator 155 may communicate with the server 160 and computer 165 via the network 135 to perform computations and/or operations such as, the fuel estimator 150 training machine learning models, the fuel estimator 150 running machine learning model, the milestone prediction estimator 155 predicting milestones for resource usage, etc.

Figure 2:
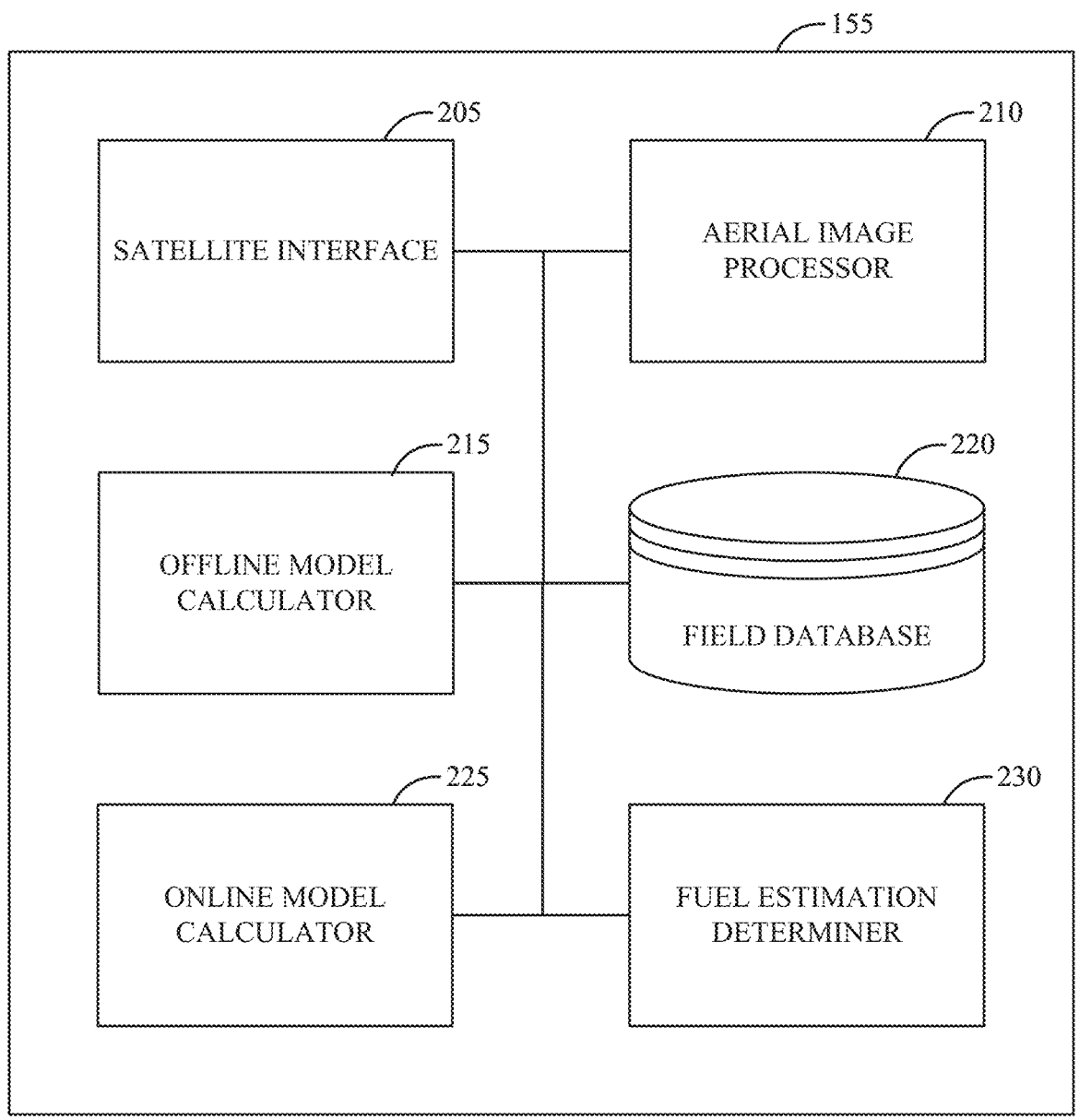
FIG. 2 is a block diagram of an example fuel estimator included in an example vehicle prediction network in the example environment of FIG. 1.

FIG. 2 is a block diagram of the example fuel estimator 150 included in the example vehicle prediction network 115 in the example environment 100 of FIG. 1. The example fuel estimator 150 of FIG. 2 includes an example satellite interface 205, an example aerial image processor 210, an example offline model calculator 215, an example field database 220, an example online model calculator 225, and an example fuel estimation determiner 230.

In the illustrated example of FIG. 2, the example satellite interface 205 obtains an aerial image of the field the machine 105 is operating on from the example satellite 130 of FIG. 1. In some examples, the satellite interface 205 is in communication with the example network 135 of FIG. 1 to obtain the aerial images from satellite 130. In some examples, the satellite interface 205 determines the current geographical location of the machine 105 to determine the aerial image of the field that machine 105 is located in. In some examples, the satellite interface 205 sends a request to the network 135 to obtain the aerial image. In some examples, the satellite interface 205 obtains a current aerial image of the field (e.g., in real time of the request to the network 135). In the illustrated example of FIG. 2, the example aerial image processor 210 determines the field metric(s) from the aerial image data obtained by the satellite interface 205. In some examples, the aerial image processor 210 determines the area of the field, the number of turns in the field, the number of stoppages in the field, the topography of the field, etc. from the aerial image of the field.

In the illustrated example of FIG. 2, the example offline model calculator 215 obtains historic field data from the example field database 220. In FIG. 2, the example field database 220 is configured to store metrics of the field during previous operations. For example, the field database 220 includes previous values for area of the field, the number of turns in the field, the number of stoppages in the field, the topography of the field, etc. from a previous operation of the machine 105. Additionally, the field database 220 includes previous total fuel required and the total fuel consumption rates from previous operation of the machine corresponding with the previous field metrics during that operation. While in the illustrated example the field database 220 is illustrated as a single database, the field database 220 may be implemented by any number and/or type(s) of databases. Furthermore, the data stored at the example field database 220 may be in any data format such as, for example, binary data, comma delimited data, tab delimited data, structured query language (SQL) structures, etc. In FIG. 2, the example field database 220 is an organized collection of data, stored on a computational system that is electronically accessible. For example, the field database 220 may be stored on a server, a desktop computer, an HDD, an SSD, or any other suitable computing system. The example offline model calculator 215 performs an offline fuel model using the historic field data obtained from the field database 220. In some examples, the offline model calculator 215 performs the offline fuel model once before operation of the machine 105 has begun. The offline model calculator 215 determines a fuel required without halt and a fuel consumption rate based on the historic field data, the current field metric(s) determined by the example aerial image processor 210, the sensor(s) data from the example equipment sensor interface 140 of FIG. 1, and the machine configuration data and machine properties for the machine 105 before operation. In examples disclosed herein, the operation is a harvesting event. However, the operation may include other agriculture operations such as, planting/seeding, spraying, etc. The example offline model calculator 215 outputs the fuel required without halt and fuel consumption rate to the example online model calculator 225. The example offline model calculator 215 is described in further detail below in connection with FIG. 3.

In the illustrated example of FIG. 2, the example online model calculator 225 collects the fuel required without halt and the fuel consumption rate from the example offline model calculator 215. The example online model calculator 225 collects the current field metric(s) determined by the example aerial image processor 210. The example online model calculator 225 performs an online fuel model to determine an updated fuel required without halt and fuel consumption rate based on the fuel required without halt and the fuel consumption rate from the offline model calculator 215, the current field metric(s), the real time sensor(s) data from the example equipment sensor interface 140 of FIG. 1, and the real time geographical location data from the example GNSS receiver 145 of FIG. 1. In examples disclosed herein, the example online model calculator 225 collects the sensor(s) data from the equipment sensor interface 140 and the geographical location data from the GNSS receiver 145 in real time during operation, and determines updated fuel required without halt and fuel consumption rate values while the machine 105 operates on a field. The example online model calculator 225 is described in further detail below in connection with FIG. 4.

In the illustrated example of FIG. 2, the example fuel estimation determiner 230 outputs the total fuel required and the total fuel consumption rate from the example online model calculator 225 to the example user interface 120 of FIG. 1 in real time during the operation of the machine 105. Additionally, in some examples, the example fuel estimation determiner 230 determines an updated, total amount of fuel required for the machine 105 during operation in real time. The example fuel estimation determiner 230 combines (sums) the example fuel required without halts and the example fuel consumption rate from the online model calculator 225. The example fuel estimation determiner 230 determines the total fuel required by multiplying the sum of the fuel required without halts and the fuel consumption rate by the halt time on the field in real time. In examples disclosed herein the total fuel required estimates the fuel consumption and wastage of fuel during halt time. In some examples, the fuel estimation determiner 230 outputs the updated, total amount of fuel required for the machine to the user interface 120. In some examples, the fuel estimation determiner 230 uses the total amount of fuel required to schedule fuel delivery for the machine 105 (e.g., at what points will fuel need to be replenished on the field, etc.).

The example fuel estimation determiner 230 monitors for new sensor(s) data from the equipment sensor interface 140 and/or new geographical location data from the GNSS receiver 145 during operation. The example fuel estimation determiner 230 determines if there are any changes in the new sensor(s) data from the equipment sensor interface 140 and/or new geographical location data from the GNSS receiver 145 during operation to determine if the example online model calculator 225 needs to perform the online fuel model to determine an updated total fuel required and an updated total fuel consumption rate based on the changed sensor(s) data and/or geographical location data. In examples disclosed herein, if the fuel estimation determiner 230 determines there are no changes in the new sensor(s) data from and the new geographical location data, the example fuel estimation determiner 230 determines if the fuel estimation process is completed using the example user interface 120. For example, the user interface 120 may include a button or indicator for an operator to select to complete the fuel estimation process. In such examples, the user interface 120 communicates that the fuel estimation process is completed to the example fuel estimation determiner 230. In examples disclosed herein, the fuel estimation determiner 230 stores the fuel consumption from the online fuel model of the example online model calculator 225 in the example field database 220 as historic field data for the next operation of the machine 105.

Figure 3:
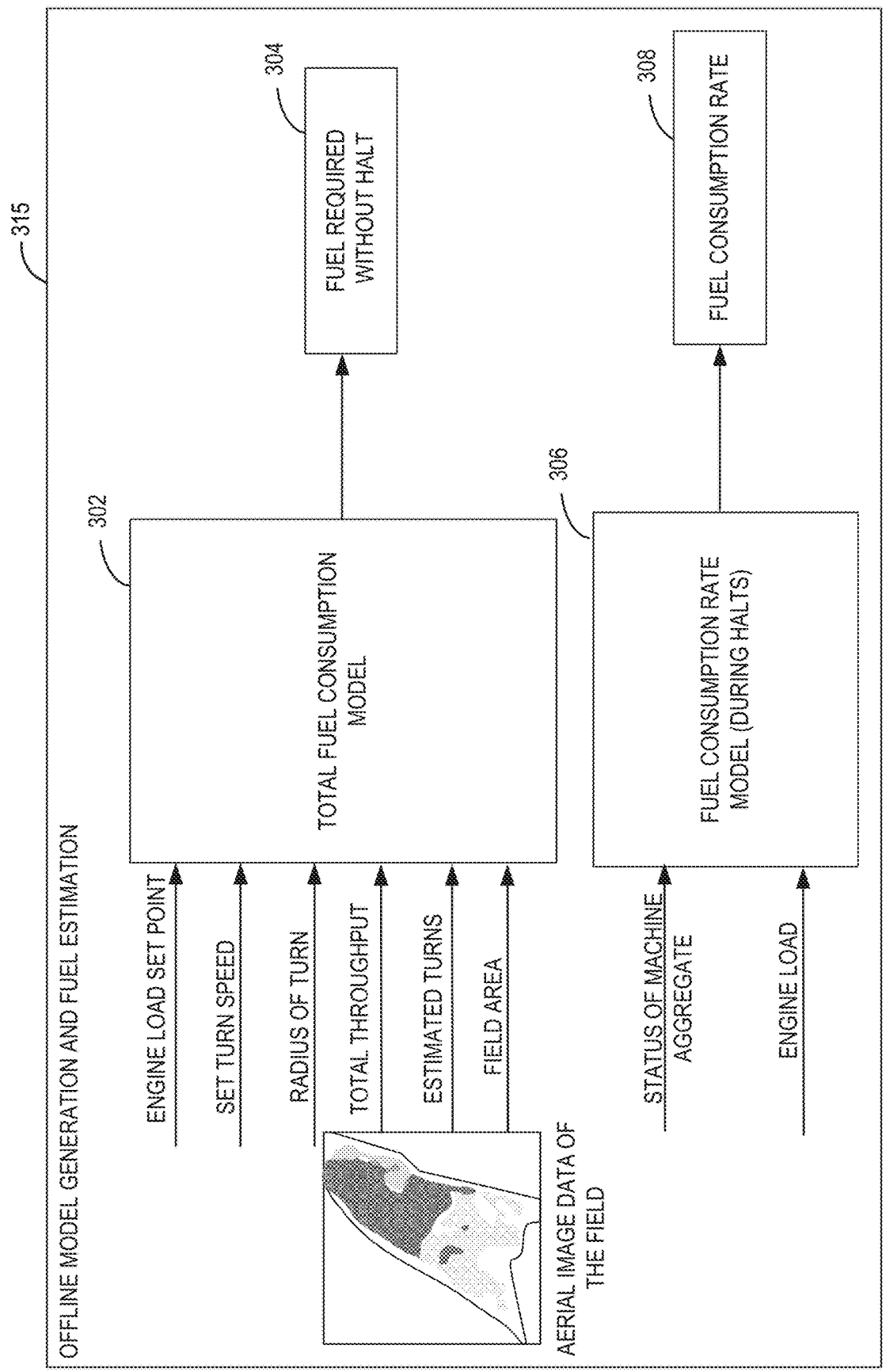
FIG. 3 is a block diagram of an example offline model calculator included in the example fuel estimator of FIG. 2.

FIG. 3 is a block diagram of the example offline model calculator 215 included in the example fuel estimator 150 of FIG. 2. The example offline model calculator 215 of FIG. 3 includes an example total fuel consumption model 302, an example fuel required without halt 304, an example fuel consumption rate model 306, and an example fuel consumption rate 308.

In the illustrated example of FIG. 3, the example total fuel consumption model 302 obtains the historic field data from the field database 220. In some examples, the historic field data includes previous values for area of the field, the number of turns in the field, the number of stoppages in the field, the topography of the field, etc. associated with previous total fuel required and the total fuel consumption rates the from a previous operation of the machine 105. The example total fuel consumption model 302 collects the engine load set point, the machine set turn speed, and radius of turn for the machine 105 from the example user interface 120 of FIG. 1. In some examples, the user interface 120 include input fields for an operator to input the engine load set point, the machine set turn speed, and the radius of turn for the machine 105. The example total fuel consumption model 302 obtains the field metric(s) from the aerial image via the example aerial image processor 210 of FIG. 2. In some examples, the total fuel consumption model 302 determines the total throughput, the number of turns on the field, and the field area from the field metrics(s) determined from the aerial image.

The example total fuel consumption model 302 runs the total fuel consumption model with the inputs of the engine load set point, the machine set turn speed, the radius of turn for the machine 105, total throughput, the number of turns on the field, the field area, and the historic field data from example field database 220. In some examples, the total fuel consumption model is a machine learning model that uses the historic field data (e.g., the fuel consumed during previous operation in the field, the fuel consumed during previous operations of other fields, etc.), the field metric(s), and the machine properties (e.g., engine load set point, the machine set turn speed, the radius of turn for the machine 105) to determine the relation between the field data and the fuel consumed during operation. The example total fuel consumption model 302 determines the example fuel required without halt 304 based on the total fuel consumption model. The example fuel required without halt 304 illustrates the amount of total fuel needed for the machine 105 to perform an operation on the field it is located in without any halts (e.g., stoppages). In examples disclosed herein, halts during operation indicate when the machine 105 stops during operation (e.g., for loading/unloading materials, etc.).

The example fuel consumption rate model 306 collects the status of the machine aggregate connection (e.g., the example implement 110 of FIG. 1) and the engine load profile for the machine 105. In some examples, the engine load depends on the characteristic of the machine 105, the configuration of the machine 105, the operating speed, types of crop and the conditions, the type of operation, total throughput, topography, etc. The example fuel consumption rate model 306 obtains the historic field data from the field database 220. In some examples, the historic field data includes previous values for the area of the field and/or other fields, the number of turns in the field and/or other fields, the number of stoppages in the field and/or other fields, the topography of the field and/or other fields, etc. associated with previous total fuel required and the total fuel consumption rates the from a previous operation of the machine 105.

The example fuel consumption rate model 306 runs the total fuel consumption rate model during halts based on the inputs of the status of the machine aggregate, the engine load, and the historic field data (e.g., the fuel consumed during halt (stoppage) of a pervious operation). In some examples, the total fuel consumption rate model during halts is a machine learning model that uses the status of machine aggregate, the engine load, and the historic field data to determine the relation between the characteristics of the machine 105 and field data with the fuel consumed during halt time of an operation. In some examples, the fuel consumption rate model 306 may determine a minimum number of required halts (e.g., for loading/unloading) during the operation based on the throughput and an input size of the materials tank for the machine 105. The example fuel consumption rate model 306 determines the example fuel consumption rate 308 based on the total fuel consumption rate model during halts. In some examples, the fuel consumption rate 308 illustrates the rate the fuel is consumed by the machine 105 to perform an operation on the field it is located in.

Figure 4:
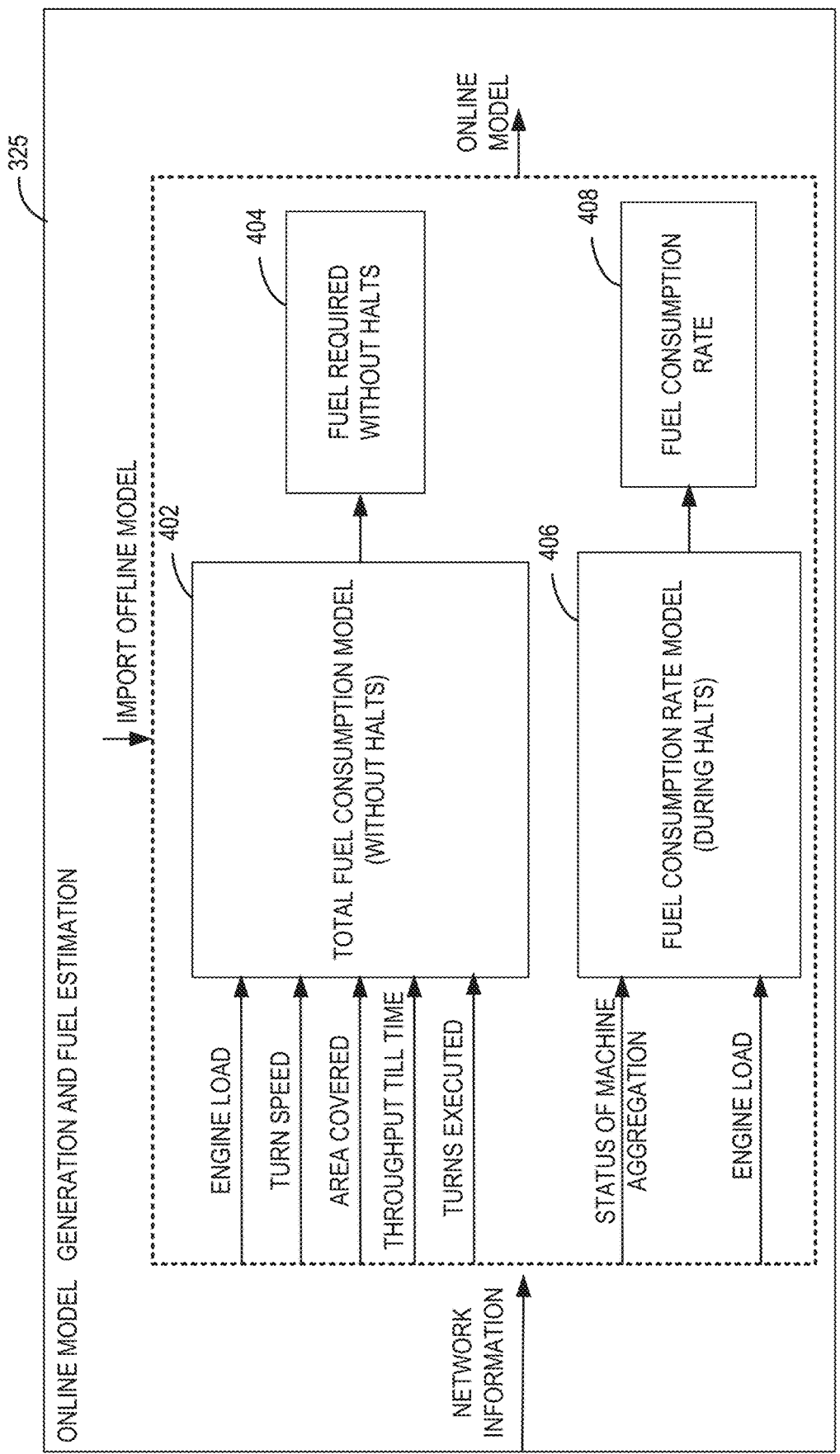
FIG. 4 is a block diagram of an example online model calculator included in the example fuel estimator of FIG. 2.

FIG. 4 is a block diagram of the example online model calculator 225 included in the example fuel estimator 150 of FIG. 2. The example online model calculator 225 of FIG. 4 includes an example total fuel consumption model 402, an example fuel required without halts 404, an example fuel consumption rate model 406, and an example fuel consumption rate 408.

In the illustrated example of FIG. 4, the example total fuel consumption model 402 collects information from the example equipment sensor interface 140 of FIG. 1 in real time during operation of the machine 105. The example total fuel consumption model 402 collects the current engine load, the machine turn speed, the current area covered, the throughput till time, the number of turns executed, number of times tank on the machine 105 is unloaded, etc. based on the information from the equipment sensor interface 140. The example total fuel consumption model 402 runs the total fuel consumption model without halts using the inputs of the current engine load profile, the machine turn speed, the current area covered, the throughput till time, the number of turns executed, number of times tank on the machine 105 is unloaded, etc. collected in real time from the equipment sensor interface 140. In some examples, the total fuel consumption model is a machine learning model that uses the input data to determine the relation between the field data and data of the machine 105 with the fuel consumed during operation in real time.

The example total fuel consumption model 402 determines the current fuel required without halts based on the total fuel consumption model. In some examples, the total fuel consumption model 402 obtains the example fuel required without halt 304 of FIG. 3 from the example offline model calculator 215. In some examples, the total fuel consumption model 402 compares the current fuel required without halts to the example fuel required without halt 304 to determine the example fuel required without halts 404. The example fuel required without halt 404 illustrates the amount of total fuel needed for the machine 105 to perform an operation on the field it is located in without any halts (e.g., stoppages) based on the current, real time data collected from the machine 105.

In the illustrated example of FIG. 4, the example fuel consumption rate model 406 collects the current status of machine aggregate (e.g., the example implement 110 of FIG. 1) and the current engine load for the machine 105. In some examples, the engine load depends on the characteristic of the machine 105, the configuration of the machine 105, the operating speed, types of crop and the conditions, the type of operation, total throughput, topography, etc. The example fuel consumption rate model 406 runs the total fuel consumption rate model during halts using the inputs of the current status of the machine aggregate and the current engine load collected in real time from the example equipment sensor interface 140. In some examples, the fuel consumption rate model during halts is a machine learning model that uses the input data to determine the relation between the characteristics of the machine 105 and field data with the fuel consumed during halt time of an operation in real time.

The example fuel consumption rate model 406 determines the current fuel consumption rate based on the total fuel consumption rate model during halts. In some examples, the example fuel consumption rate model 406 obtains the example fuel consumption rate 308 of FIG. 3 from the example offline model calculator 215. In some examples, the fuel consumption rate model 406 compares the current fuel consumption rate to the example fuel consumption rate 308 to determine the example fuel consumption rate 408. The example fuel consumption rate 408 illustrates the rate the fuel is consumed by the machine 105 to perform an operation on the field including halts (e.g., stoppages) based on the current, real time data collected from the machine 105.

Figure 5:
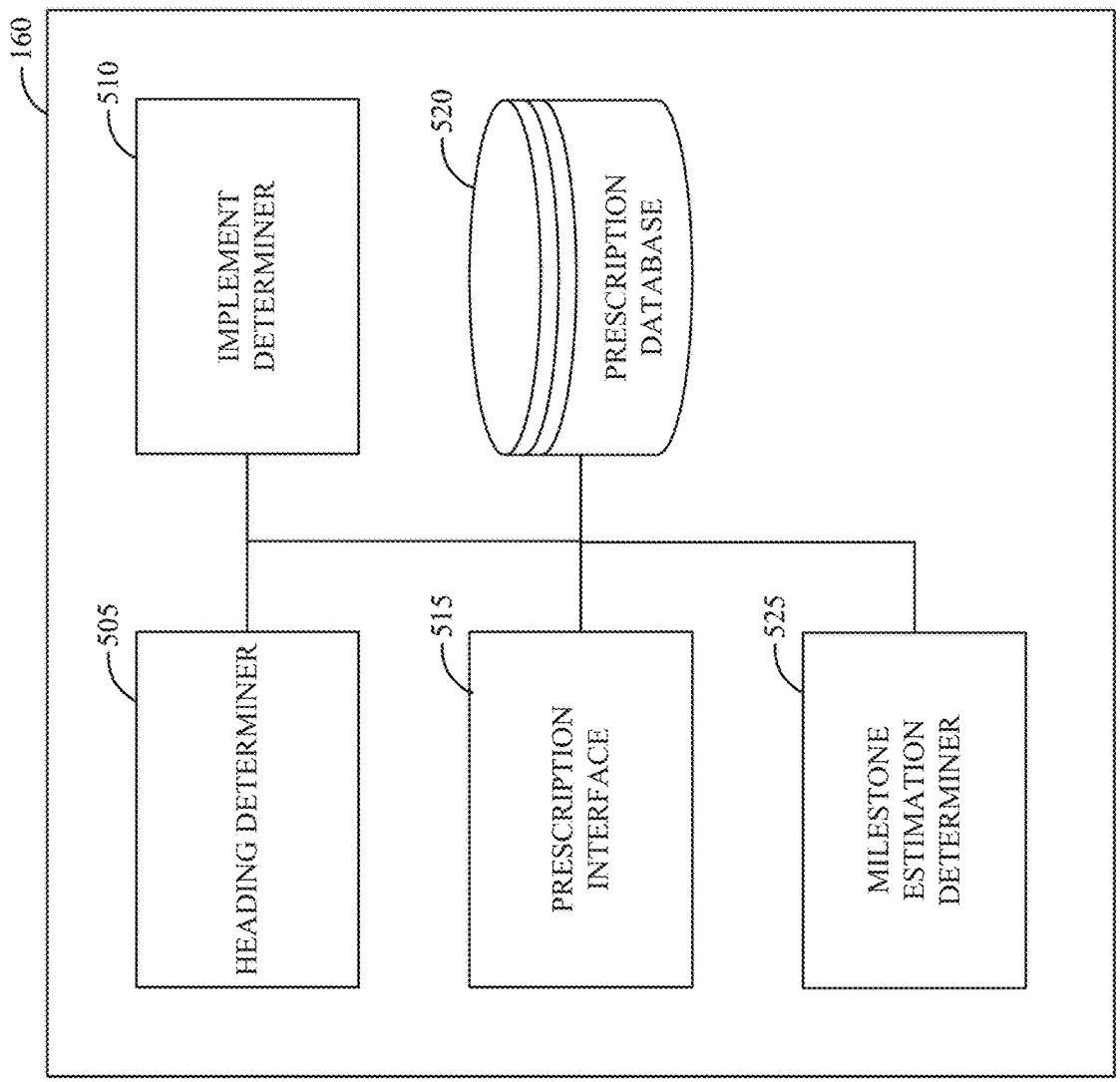
FIG. 5 is a block diagram of an example milestone prediction estimator included in an example vehicle prediction network in the example environment of FIG. 1.

FIG. 5 is a block diagram of the example milestone prediction estimator 155 included in the example vehicle prediction network 115 in the example environment 100 of FIG. 1. The example milestone prediction estimator 155 of FIG. 5 includes an example heading determiner 505, an example implement determiner 510, an example prescription interface 515, an example prescription database 520, and an example milestone estimation determiner 525.

In the illustrated example of FIG. 5, the example heading determiner 505 determines the machine heading from the sensor(s) data collected by the example equipment sensor interface 140 of FIG. 1. The example heading determiner 505 determines the heading (e.g., the angular direction the nose of the machine 105 is facing) based on the example sensors 125 of FIG. 1. In the illustrated example of FIG. 5, the example implement determiner 510 determines the machine implement (e.g., the example implement 110 of FIG. 1). In some examples, the example user interface 120 of FIG. 1 includes and input field for the operator to specify the type of the example implement 110. In some examples, the implement determiner 510 obtains the information of the type of the implement 110 from the user interface 120.

In some examples, the implement determiner 510 determines the example implement 110 is a slurry applicator. In such examples, the implement determiner 510 obtains the slurry applicator working width that is input by the operator in the example user interface 120. The implement determiner 510 also determines the current tank volume of the slurry and the current fuel usage based on the sensor(s) data from the example equipment sensor interface 140. In some examples, the implement determiner 510 determines the example implement 110 is a planter/seeder. In such examples, the implement determiner 510 obtains the number of bins, the bin volume(s), and the bin chaining mechanism from the example user interface 120 and the example equipment sensor interface 140. The example implement determiner 510 also determines the current bin volume and the seeding/planting rate. In some examples, the implement determiner 510 determines the example implement 110 is an implement/spraying/spreading machine with a known/defined operating width. In such examples, the implement determiner 510 obtains the implement working width that is input by the operator via the user interface 120. The example implement determiner 510 also determines the current tank volume and chemical usage rate based on the sensor(s) data from the equipment sensor interface 140.

The example prescription interface 515 obtains the prescriptions from the example prescription database 520 based on the current geographical location obtained from the example GNSS receiver 145 of FIG. 1. In examples disclosed herein, the prescriptions are used to disperse/release the resource of the machine 105 (e.g., spray the chemical, spread seeds, etc.) at different rates depending on the different characteristics of the field (e.g., soil content, crop, etc.) in different locations. In examples disclosed herein, the prescriptions are used to adjust dispersal of resources (e.g., chemical, seeds, slurry, etc.) in a field based on the conditions/characteristics of regions within the field. In examples disclosed herein, the prescriptions define a rate at which the implement 110 and/or the machine 105 releases the resources (e.g., chemical, seed, etc.) and/or a rate of speed for the machine 105 to release the resource (e.g., slurry, etc.). The example prescription interface 515 obtains the prescriptions for variable speed rate for slurry, planting and seeding, or the rate at which a chemical should be applied in a field based on the type of the implement 110 determined by the example implement determiner 510. The example prescription interface 515 also obtains prescriptions for look-ahead (approaching) coordinates based on the current geographical location and the machine heading determined by the example heading determiner 505.

In the illustrated example of FIG. 5, the example prescription database 520 is configured to store prescriptions that define the dispersion of the resource of the machine 105 (e.g., spray the chemical, spread seeds, etc.) at different rates and/or the prescriptions that define the rate of speed for the machine 105 for dispersion of the resource depending on the different characteristics of the field (e.g., soil content, crop, etc.) in different locations. For example, the prescription database 520 includes prescriptions for slurry applicators, planter/seeders, spreading/spraying implements, etc. and the corresponding geographical locations of those prescriptions. While in the illustrated example the prescription database 520 is illustrated as a single database, the prescription database 520 may be implemented by any number and/or type(s) of databases. Furthermore, the data stored at the example prescription database 520 may be in any data format such as, for example, binary data, comma delimited data, tab delimited data, structured query language (SQL) structures, etc. In FIG. 5, the example prescription database 520 is an organized collection of data, stored on a computational system that is electronically accessible. For example, the prescription database 520 may be stored on a server, a desktop computer, an HDD, an SSD, or any other suitable computing system.

In the illustrated example of FIG. 5, the example milestone estimation determiner 525 determines the prediction milestones for a slurry applicator, a planter/seeder, and/or any other implement determined by the example implement determiner 510. In some examples, the milestone estimation determiner 525 determiner the prediction milestones based on the implement type determined by the example implement determiner 510. In some examples, if the implement determiner 510 determines the example implement 110 is a slurry applicator, the example milestone estimation determiner 525 calculates the distance-til-empty for the slurry applicator. In some examples, the milestone estimation determiner 525 determines a map of milestones of the distance-til-empty for the slurry applicator based on the geographical location data and the prescriptions. In examples of a slurry applicator, the slurry applicator does not have control over variable rate for applying slurry in the field. In such examples, the speed of the machine 105 is controlled (e.g., with the help of a MCS (Manure constituent Sensing) controller) using the prescriptions that define a rate of speed for the machine 105 that are obtained by the example prescription interface 515 to achieve the effective application of slurry.

In some examples, it is difficult for the example milestone estimation determiner 525 to calculate the distance-til-empty for a slurry applicator because the machine 105 makes many stops/halts and the driving speed is variable to apply the slurry effectively per the prescriptions. Additionally, the example milestone estimation determiner 525 is not able to account for the variable speed and the fuel burned due to engine idling time when determining the distance incremented while the machine 105 is moving. The example milestone estimation determiner 525 is in communication with the MCS controller (that adjusts the speed of the machine 105 based on the prescriptions), the user interface 120 of FIG. 1, and the equipment sensor interface 140. In some examples, the milestone estimation determiner 525 is in communication with an engine control unit (ECU) and actuators via the equipment sensor interface 140 to determine fuel usage from sensors in the ECU. The example milestone estimation determiner 525 obtains the following inputs: heading information from the heading determiner 505, the working width of the implement (slurry applicator) from the user interface 120, the current geographical location from the GNSS receiver 145, the current tank volume and fuel usage rate from the equipment sensor interface 140, and the prescription rates for the current geographical location and look-ahead coordinates based on the heading from the prescription interface 515. The example milestone estimation determiner 525 uses the inputs to predict the distance-til-empty for various upcoming milestones (e.g., positions along the path the machine 105 is following based on the heading). In some examples, the milestone estimation determiner 525 may additionally or alternatively determine the fuel remaining, distance remaining, and time to empty for the slurry applicator based on the inputs. In some examples, the milestone estimation determiner 525 generates a map of the milestones and outputs the map to the user interface 120. In some examples, the map of the milestones includes indicators of where the milestone positions are with the corresponding values for fuel remaining, distance remaining, time to empty, and/or distance til empty at that position.

In some examples, if the implement determiner 510 determines the example implement 110 is a planter/seeder, the example milestone estimation determiner 525 calculates the distance-til-empty for the planter/seeder. In some examples, the milestone estimation determiner 525 determines a map of milestones of the distance-til-empty for the planter/seeder based on the geographical location data and the prescriptions. In some examples, the milestone estimation determiner 525 is in communication with an engine control unit (ECU) and actuators via the equipment sensor interface 140 to determine fuel usage from sensors in the ECU. The example milestone estimation determiner 525 obtains the following inputs: heading information from the heading determiner 505, the working width of the implement (planter/seeder) and seed bin information (number of bins, their volumes, knowledge of any bin chaining mechanism, etc.) from the user interface 120, the current geographical location from the GNSS receiver 145, the current bin volume and seeding/planting rate from the equipment sensor interface 140, and the prescription rates for the current geographical location and look-ahead coordinates based on the heading from the prescription interface 515. The example milestone estimation determiner 525 uses the inputs to predict the distance-til-empty for various upcoming milestones (e.g., positions along the path the machine 105 is following based on the heading). In some examples, the milestone estimation determiner 525 may additionally or alternatively determine the fuel remaining, distance remaining, and time to empty for the planter/seeder based on the inputs. In some examples, the milestone estimation determiner 525 generates a map of the milestones and outputs the map to the user interface 120. In some examples, the map of the milestones includes indicators of where the milestone positions are with the corresponding values for fuel remaining, distance remaining, time to empty, and/or distance til empty at that position.

In some examples, if the implement determiner 510 determines the example implement 110 is an implement (e.g., spreader/sprayer, etc.) with a known working width, the example milestone estimation determiner 525 calculates the time to empty for the implement. In some examples, the milestone estimation determiner 525 determines a map of milestones of the time to empty for the implement based on the geographical location data and the prescriptions. In some examples, the milestone estimation determiner 525 is in communication with an engine control unit (ECU) and actuators via the equipment sensor interface 140 to determine fuel usage from sensors in the ECU. The example milestone estimation determiner 525 obtains the following inputs: heading information from the heading determiner 505, the working width of the implement from the user interface 120, the current geographical location from the GNSS receiver 145, the current tank volume and chemical usage rate from the equipment sensor interface 140, and the prescription rates for the current geographical location and look-ahead coordinates based on the heading from the prescription interface 515. The example milestone estimation determiner 525 uses the inputs to predict the time to empty for various upcoming milestones (e.g., positions along the path the machine 105 is following based on the heading). In some examples, the milestone estimation determiner 525 may additionally or alternatively determine the fuel remaining, distance remaining, and distance-til-empty for the implement based on the inputs. In some examples, the milestone estimation determiner 525 generates a map of the milestones and outputs the map to the user interface 120. In some examples, the map of the milestones includes indicators of where the milestone positions are with the corresponding values for fuel remaining, distance remaining, time to empty, and/or distance til empty at that position.

Figure 6:
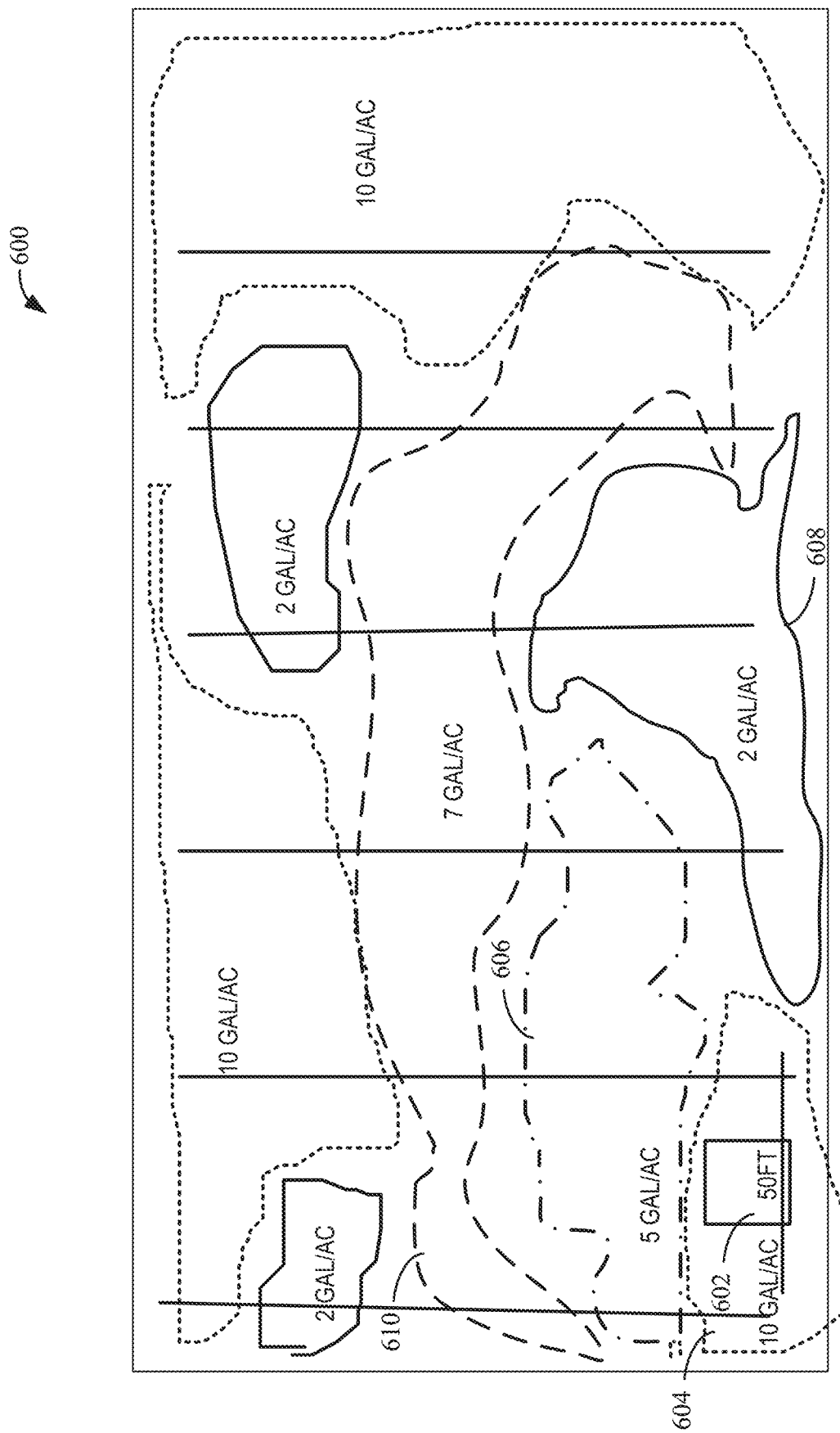
FIG. 6 is an illustration of an example prescription map for a field in accordance with the teachings of this disclosure.

FIG. 6 is an illustration of an example prescription map 600 for a field in accordance with the teachings of this disclosure. The example prescription map 600 is illustrative of an example map of the prescription information that is stored in the example prescription database 520 of FIG. 5. In the illustrated example of FIG. 6, the prescription map 600 includes an example starting position 602 for a machine (e.g., the example machine 105 of FIG. 1), an example first prescription zone 604, an example second prescription zone 606, an example third prescription zone 608, and an example fourth prescription zone 610. In the illustrated example, the starting position 602 is illustrative of a position in the map where the machine 105 starts in traversing the field.

The example prescription map 600 illustrates several regions/zones throughout the field (e.g., the first prescription zone 604, the second prescription zone 606, the third prescription zone 608, and the fourth prescription zone 610) that indicate different prescription rates. For example, the first prescription zone 604 indicates a prescription rate of 10 gallons/acres (GAL/AC), the second prescription zone 606 indicates a prescription rate of 5 GAL/AC, the third prescription zone 608 indicates a prescription rate of 2 GAL/AC, and the fourth prescription zone 610 indicates a prescription rate of 7 GAL/AC. In the illustrated example, the prescription map 600 is indicative of prescription rates for a chemical (e.g., for a spraying/spreading implement). The example first prescription zone 604, the second prescription zone 606, the third prescription zone 608, and the fourth prescription zone 610 may include different prescription rates or different agricultural operations (e.g., seeding/planting, slurry application, etc.). The example first prescription zone 604, the second prescription zone 606, the third prescription zone 608, and the fourth prescription zone 610 are illustrative of the prescription rate at which the machine 105 should operate when located in the zone.

Figure 7:
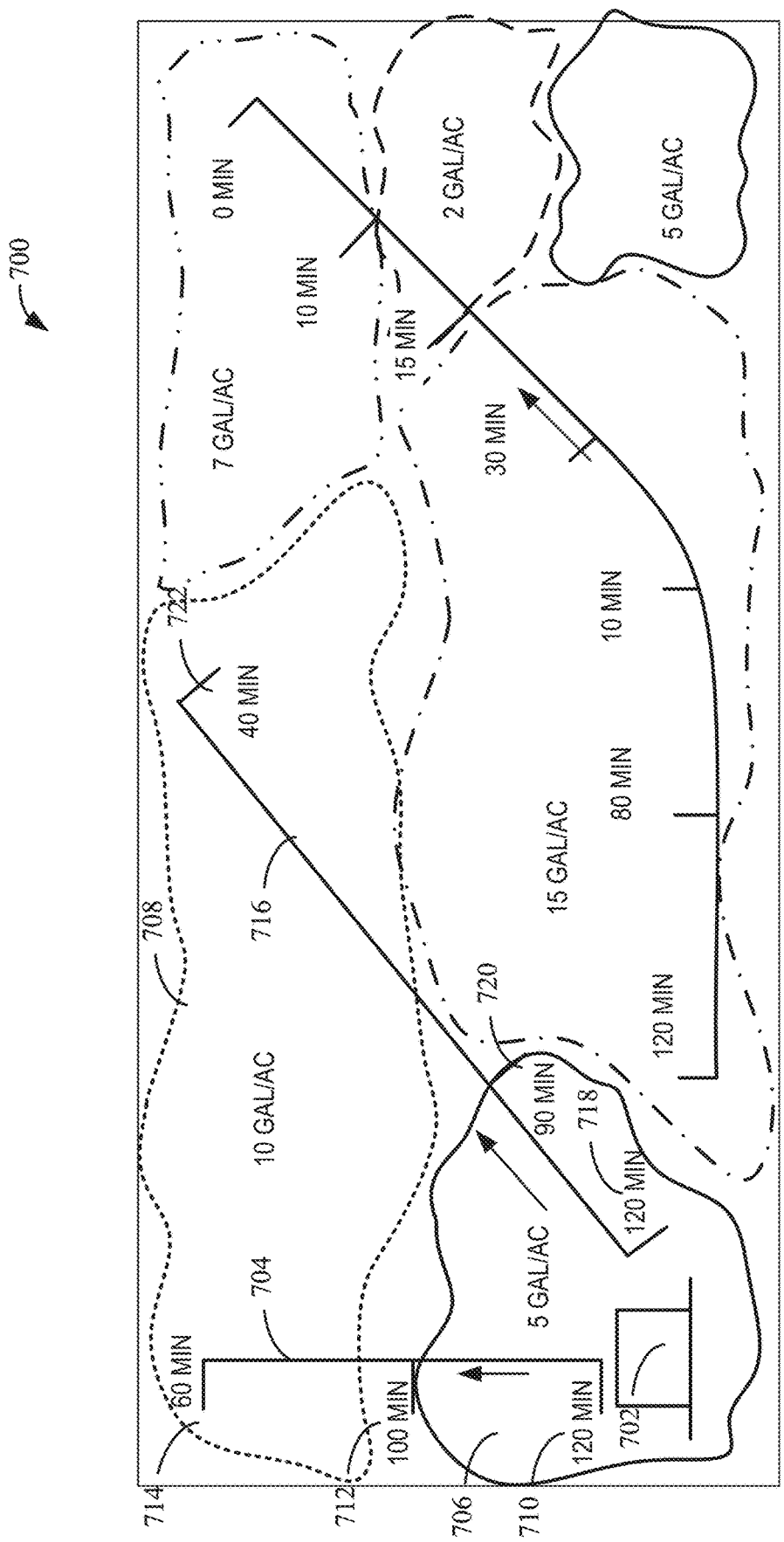
FIG. 7 is an illustration of an example map of milestones in a field determined by the example milestone prediction estimator of FIG. 1 based on prescription regions without an auto tracking feature.

FIG. 7 is an illustration of an example map 700 of milestones in a field determined by the example milestone prediction estimator 155 of FIG. 1 based on prescription regions without an auto tracking feature. The illustrated example of FIG. 7 illustrates the map 700 of milestones in a field based on an agriculture machine (e.g., the example machine 105 of FIG. 1) that does not have an auto tracking feature (e.g., the agriculture machine does not have an automated driving feature to automatically follow a desired path). The example map 700 includes an example machine position 702, an example first projected path 704, an example first prescription zone 706, an example second prescription zone 708, an example first milestone 710, an example second milestone 712, an example third milestone 714, an example second projected path 716, an example fourth milestone 718, an example fifth milestone 720, and an example sixth milestone 722.

In the illustrated example of FIG. 7, the example machine position 702 illustrates the position of the machine 105 in the field based on the geographical location from the example GNSS receiver 145 of FIG. 1. In FIG. 7, the machine position 702 is in a starting position in the field. However, the machine position 702 is updated in real time as the machine 105 moves. In the illustrated example, the example milestone estimation determiner 525 included in the example milestone prediction estimator 155 of FIG. 5 predicts/estimates milestones for projected paths (e.g., the first projected path 704 and the second projected path 716) based on the machine heading information determined by the example heading determiner 505. In FIG. 7, since the machine 105 does not have an auto tracking feature, the example milestone estimation determiner 525 uses projected paths (e.g., the first projected path 704 and the second projected path 716) that the machine 105 may follow based on the heading information and current geographical location.

In the illustrated example, the map 700 also includes the first prescription zone 706 and the second prescription zone 708. The example first prescription zone 706 and the second prescription zone 708 indicate different prescription rates for the associated geographical locations. For example, the first prescription zone 706 indicates a prescription rate of 5 GAL/AC and the second prescription zone 708 indicates a prescription rate of 10 GAL/AC. In the illustrated example, the first prescription zone 706 and the second prescription zone 708 are indicative of prescription rates for a chemical (e.g., for a spraying/spreading implement). The example first prescription zone 706 and the second prescription zone 708 may include different prescription rates for different agricultural operations (e.g., seeding/planting, slurry application, etc.). The example first prescription zone 706 and the second prescription zone 708 are illustrative of the prescription rate at which the machine 105 should operate when located in the zone.

In the illustrated example of FIG. 7, both the first projected path 704 and the second projected path 716 traverse the first prescription zone 706 and the second prescription zone 708. The example milestone estimation determiner 525 uses the geographical location data and the heading information to determine if the machine 105 is in the first prescription zone 706 and the second prescription zone 708 to determine the prescription rate that should be used in predicting the milestones (e.g., the first milestone 710, the second milestone 712, the third milestone 714, the fourth milestone 718, the fifth milestone 720, and the sixth milestone 722).

In the illustrated example of FIG. 7, the example milestone estimation determiner 525 predicts the first milestone 710, the second milestone 712, and the third milestone 714 for the first projected path 704 and the fourth milestone 718, the fifth milestone 720, and the sixth milestone 722 for the second projected path 716 to illustrate milestone locations for measurements such as, time to empty, distance-til-empty, etc. based on the prescription rate, sensor(s) data, etc. In the illustrated example, the first milestone 710, the second milestone 712, the third milestone 714, the fourth milestone 718, the fifth milestone 720, and the sixth milestone 722 illustrate time to empty predictions. However, the map 700 may include other predictive measurements from the example milestone estimation determiner 525 (e.g., distance-til-empty, fuel remaining, etc.).

In FIG. 7, the first milestone 710 includes the information of 120 minutes, the second milestone 712 includes the information of 100 minutes, and the third milestone 714 includes the information of 60 minutes, which are indicative of the time to empty measurements at those milestones from the example milestone estimation determiner 525 based on the first projected path 704. The fourth milestone 718 includes the information of 120 minutes, the fifth milestone 720 includes the information of 90 minutes, and the sixth milestone 722 includes the information of 40 minutes, which are indicative of the time to empty measurement at those milestones based on the second projected path 716. In some examples, the milestone estimation determiner 525 estimates time to empty measurements for a material in the machine 105 (e.g., a chemical for spraying, seeds for planting, etc.). For example, at the example first milestone 710, the milestone estimation determiner 525 predicts the material included in the machine 105 will be empty in 120 minutes if the machine 105 continues on the first projected path 704. In examples disclosed herein, the example milestone estimation determiner 525 updates the map 700 in real time as the machine 105 moves around the field, and the example milestone estimation determiner 525 adjusts the projected paths (e.g., the first projected path 704 and the second projected path 716) and the milestone markers (e.g., the first milestone 710, the second milestone 712, the third milestone 714, the fourth milestone 718, the fifth milestone 720, and the sixth milestone 722) based on the geographical location, heading information, and other sensor(s) data from the machine 105.

Figure 8:
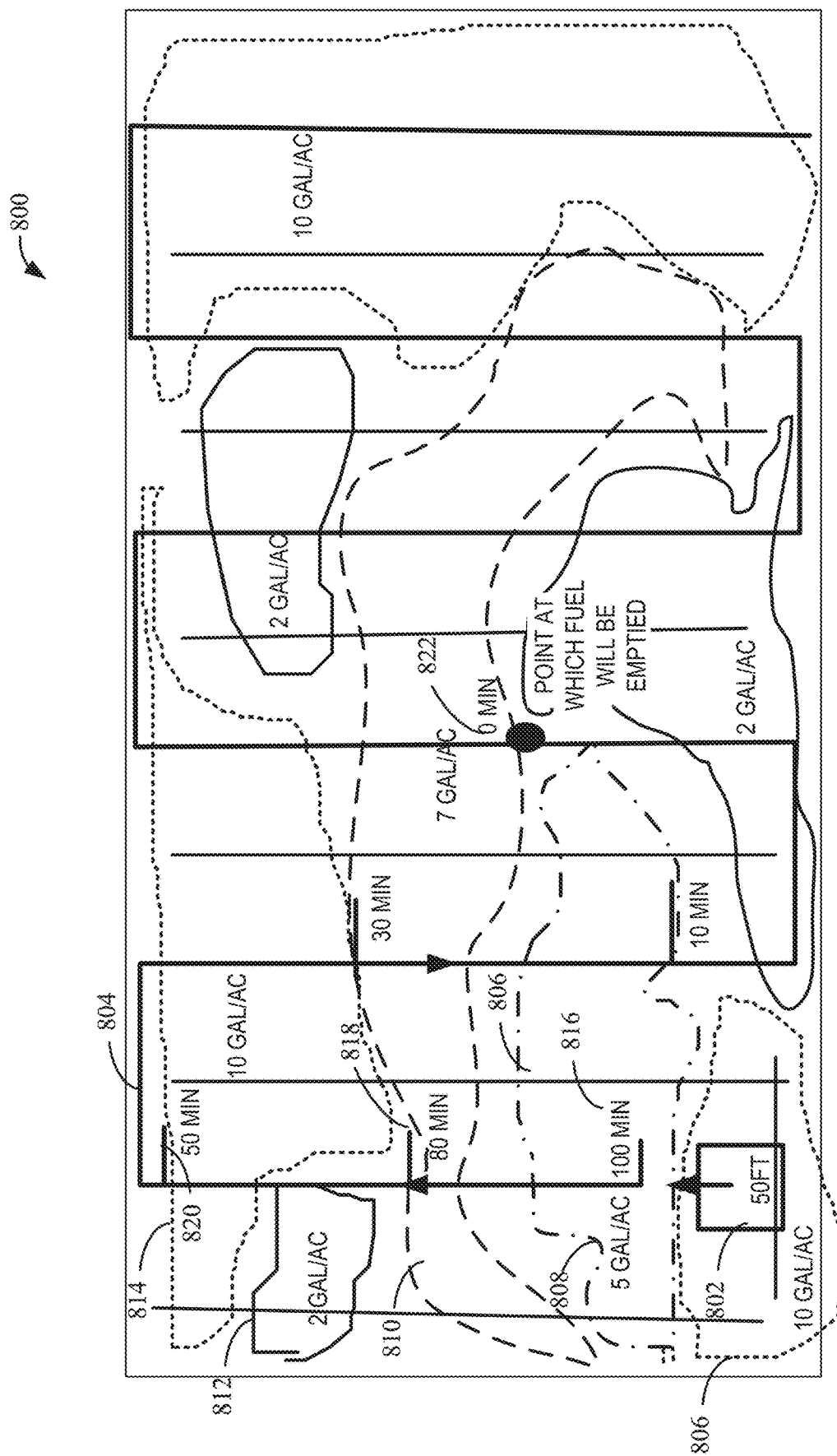
FIG. 8 is an illustration of an example map of milestones in a field determined by the example milestone prediction estimator of FIG. 1 based on prescription regions with an auto tracking feature.

FIG. 8 is an illustration of an example map 800 of milestones in a field determined by the example milestone prediction estimator 155 of FIG. 1 based on prescription regions with an auto tracking feature. The illustrated example of FIG. 8 illustrates the map 800 of milestones in a field based on an agriculture machine (e.g., the example machine 105 of FIG. 1) that does have an auto tracking feature (e.g., the agriculture machine includes an automated driving feature to automatically follow a desired path). The example map 800 includes an example machine position 802, an example auto-tracking path 804, an example first prescription zone 806, an example second prescription zone 808, an example third prescription zone 810, an example fourth prescription zone 812, an example fifth prescription zone 814, an example first milestone 816, an example second milestone 818, an example third milestone 820, and an example final milestone 822.

In the illustrated example of FIG. 8, the example machine position 802 illustrates the position of the machine 105 in the field based on the geographical location from the example GNSS receiver 145 of FIG. 1. In FIG. 8, the machine position 802 is in a starting position in the field. However, the machine position 802 is updated in real time as the machine 105 moves. In the illustrated example, the example auto-tracking path 804 illustrates the path in which the machine 105 is following based on the auto tracking feature that directs the machine 105 in the field. In the illustrated example of FIG. 8, the example milestone estimation determiner 525 determines prescription milestones (e.g., the first milestone 816, the second milestone 818, the third milestone 820, and the final milestone 822) on the auto-tracking path 804.

In the illustrated example, the map 800 also includes the first prescription zone 806, the second prescription zone 808, the third prescription zone 810, the fourth prescription zone 812, and the fifth prescription zone 814. The first prescription zone 806, the second prescription zone 808, the third prescription zone 810, the fourth prescription zone 812, and the fifth prescription zone 814 indicate different prescription rates for the associated geographical locations. For example, the first prescription zone 806 indicates a prescription rate of 10 GAL/AC, the second prescription zone 808 indicates a prescription rate of 5 GAL/AC, the third prescription zone 810 indicates a prescription rate of 7 GAL/AC, the fourth prescription zone 812 indicates a prescription rate of 2 GAL/AC, and the fifth prescription zone 814 indicates a prescription rate of 10 GAL/AC. In the illustrated example, the first prescription zone 806, the second prescription zone 808, the third prescription zone 810, the fourth prescription zone 812, and the fifth prescription zone 814 are indicative of prescription rates for a chemical (e.g., for a spraying/spreading implement). The first prescription zone 806, the second prescription zone 808, the third prescription zone 810, the fourth prescription zone 812, and the fifth prescription zone 814 may include different prescription rates or different agricultural operations (e.g., seeding/planting, slurry application, etc.). The example first prescription zone 806, the second prescription zone 808, the third prescription zone 810, the fourth prescription zone 812, and the fifth prescription zone 814 are illustrative of the prescription rate at which the machine 105 should operate when located in the zone.

In the illustrated example of FIG. 7, the auto-tracking path 804 traverses the first prescription zone 806, the second prescription zone 808, the third prescription zone 810, the fourth prescription zone 812, and the fifth prescription zone 814. The example milestone estimation determiner 525 uses the geographical location data to determine if the machine 105 is in the first prescription zone 806, the second prescription zone 808, the third prescription zone 810, the fourth prescription zone 812, or the fifth prescription zone 814 to determine the prescription rate that should be used in predicting the milestones (e.g., the first milestone 816, the second milestone 818, the third milestone 820, and the final milestone 822).

In the illustrated example of FIG. 8, the example milestone estimation determiner 525 predicts the first milestone 816, the second milestone 818, the third milestone 820, and the final milestone 822 for the auto-tracking path 804 to illustrate milestone locations for measurements such as, time to empty, distance-til-empty, etc. based on the prescription rate, sensor(s) data, etc. In the illustrated example, the first milestone 816, the second milestone 818, the third milestone 820, and the final milestone 822 illustrate time to empty predictions. However, the map 800 may include other predictive measurements from the example milestone estimation determiner 525 (e.g., distance-til-empty, fuel remaining, etc.).

In FIG. 8, the first milestone 816 includes the information 100 minutes, the second milestone 818 includes the information 80 minutes, the third milestone 820 includes the information 50 minutes, and the final milestone 822 includes the information 0 minutes. In some examples, the milestone estimation determiner 525 estimates time to empty measurements for a material in the machine 105 (e.g., a chemical for spraying, seeds for planting, etc.). For example, at the example first milestone 816, the milestone estimation determiner 525 predicts the material included in the machine 105 will be empty in 100 minutes if the machine 105 continues on the auto-tracking path 804. In the illustrated example, the final milestone 822 indicates when the material of the machine 105 (e.g., fuel, chemical, seeds, slurry, etc.) is empty. In the map 800, the final milestone 822 is indicated as a circular icon. However, other identifications/icons may be used to identify the final milestone 822 on the map 800. In examples disclosed herein, the example milestone estimation determiner 525 updates the map 800 in real time as the machine 105 moves around the field, and the example milestone estimation determiner 525 adjusts the milestone markers (e.g., the first milestone 816, the second milestone 818, the third milestone 820, and the final milestone 822) based on the geographical location and other sensor(s) data from the machine 105.

Figure 9:
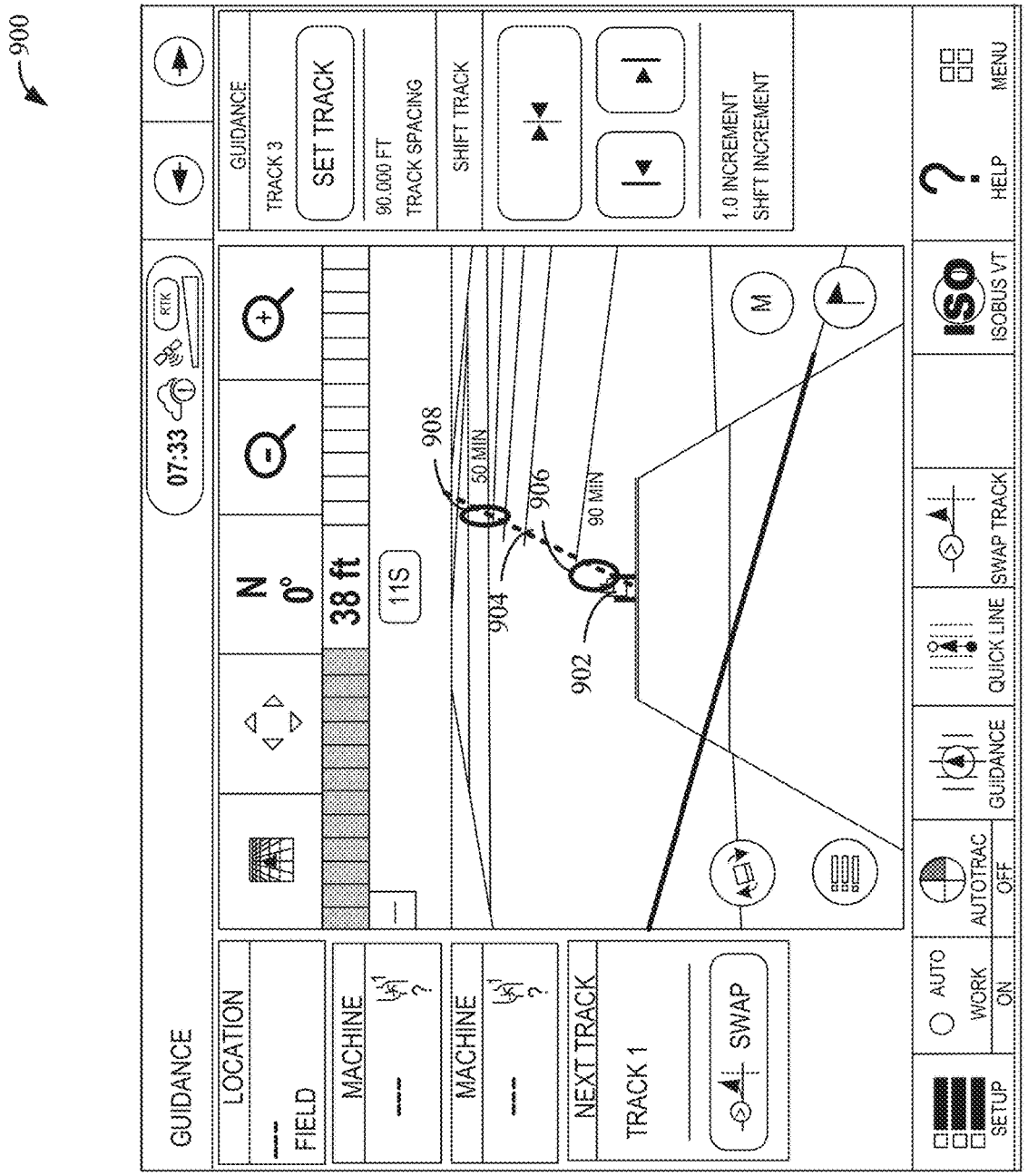
FIG. 9 is an illustration of an example user interface included in the example environment of FIG. 1 in conjunction with the example milestone prediction estimator of FIG. 1 without an auto tracking feature.

FIG. 9 is an illustration of the example user interface 120 included in the example environment 100 of FIG. 1 in conjunction with the example milestone prediction estimator 155 of FIG. 1 without an auto tracking feature. The illustrated example of FIG. 9 includes an example display 900 to display the map of milestones generated by the example milestone prediction estimator 155. The illustrated example of FIG. 9 illustrates the map of milestones based on an agriculture machine that does not have an auto tracking feature (e.g., the agriculture machine does not have an automated driving feature to automatically follow a desired path). The example display 900 includes an example machine icon 902, an example projected path 904, an example first milestone 906, and an example second milestone 908.

In the illustrated example of FIG. 9, the example machine icon 902 illustrates the current geographical location of the machine (e.g., the example machine 105 of FIG. 1) on the field. In some examples, the user interface 120 obtains the current geographical location from the example GNSS receiver 145 to determine the placement of the machine icon 902. The example projected path 904 illustrates the direction in which the machine 105 is headed based on the heading information determined by the example heading determiner 505. In the illustrated example of FIG. 9, the example first milestone 906 and the example second milestone 908 illustrate two milestone locations on the projected path 904 as determined by the example milestone prediction estimator 155. In the illustrated example, the first milestone 906 and the second milestone 908 are illustrated as circular icons. However, other identification/icons (e.g., flags, asterisks, etc.) may be used to illustrate the first milestone 906 and the second milestone 908 on the example display 900.

In the illustrated example, the first milestone 906 includes the information of 90 minutes and the second milestone 908 includes the information of 50 minutes, which are indicative of the time to empty measurements at those milestones from the example milestone estimation determiner 525 included in the example milestone prediction estimator 155 of FIG. 5. In some examples, the milestone estimation determiner 525 estimates time to empty measurements for a material in the machine 105 (e.g., a chemical for spraying, seeds for planting, etc.). For example, at the example first milestone 906, the milestone estimation determiner 525 predicts the material included in the machine 105 will be empty in 90 minutes. In examples disclosed herein, the display 900 is updated as the machine 105 moves around the field, and the example milestone prediction estimator 155 adjusts the project path 904 and the milestone markers (e.g., the first milestone 906 and the second milestone 908) based on the geographical location and other sensor(s) data from the machine 105.

Figure 10:
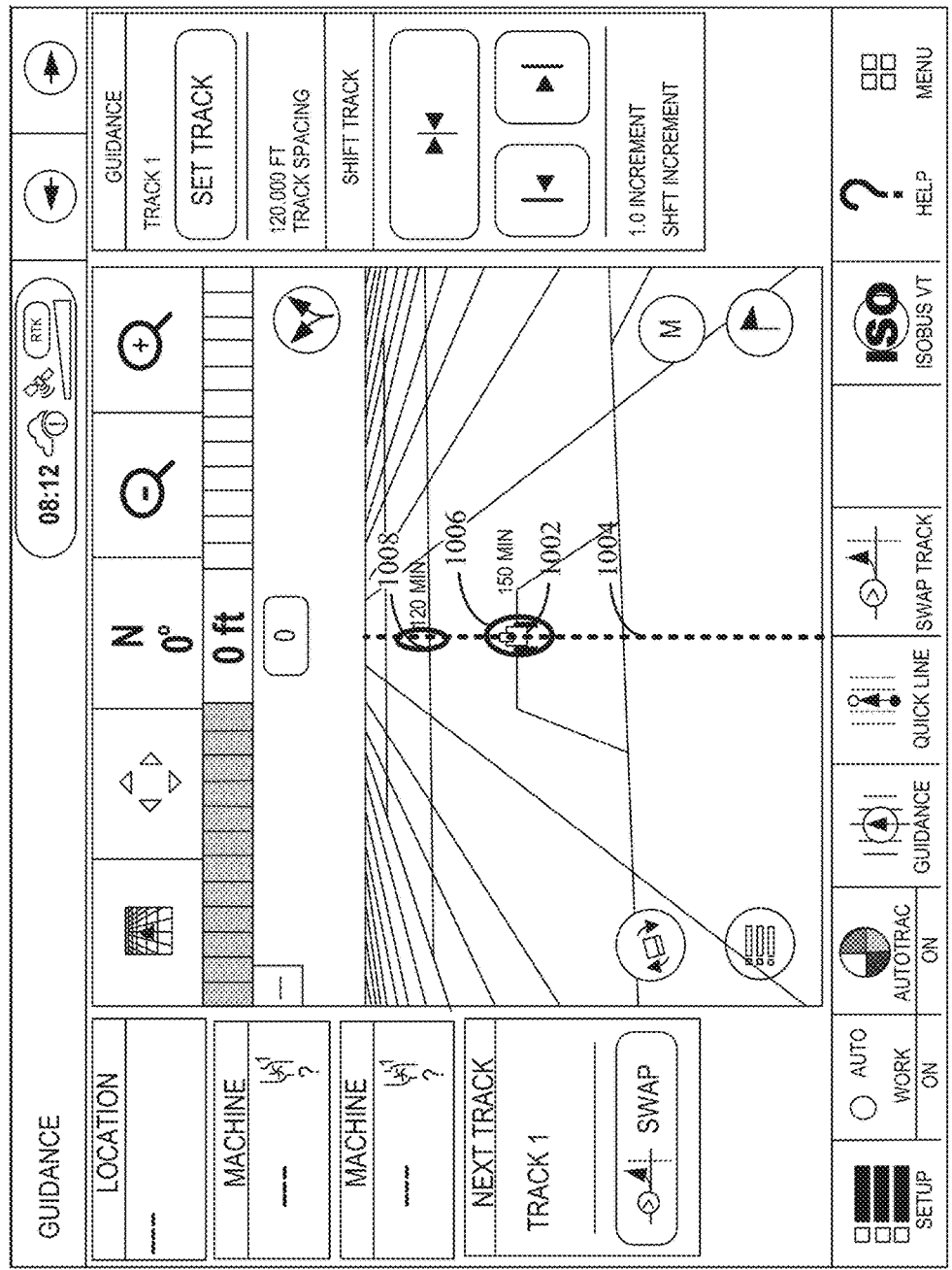
FIG. 10 is an illustration of an example user interface included in the example environment of FIG. 1 in conjunction with the example milestone prediction estimator of FIG. 1 with an auto tracking feature.

FIG. 10 is an illustration of the example user interface 120 included in the example environment 100 of FIG. 1 in conjunction with the example milestone prediction estimator 155 of FIG. 1 with an auto tracking feature. The illustrated example of FIG. 10 includes an example display 1000 to display the map of milestones generated by the example milestone prediction estimator 155. The illustrated example of FIG. 10 illustrates the map of milestones based on an agriculture machine that does have an auto tracking feature (e.g., the agriculture machine includes an automated driving feature to automatically follow a desired path). The example display 1000 includes an example machine icon 1002, an example projected path 1004, an example first milestone 1006, and an example second milestone 1008.

In the illustrated example of FIG. 10, the example machine icon 1002 illustrates the current geographical location of the machine (e.g., the example machine 105 of FIG. 1) on the field. In some examples, the user interface 120 obtains the current geographical location from the example GNSS receiver 145 to determine the placement of the machine icon 1002. The example projected path 1004 illustrates the path in which the machine 105 is following based on the auto tracking feature that directs the machine 105 in the field. In the illustrated example of FIG. 10, the example first milestone 1006 and the example second milestone 1008 illustrate two milestone locations on the projected path 1004 as determined by the example milestone prediction estimator 155. In the illustrated example, the first milestone 1006 and the second milestone 1008 are illustrated as circular icons. However, other identification/icons (e.g., flags, asterisks, etc.) may be used to illustrate the first milestone 1006 and the second milestone 1008 on the example display 1000.

In the illustrated example, the first milestone 1006 includes the information of 150 minutes and the second milestone 1008 includes the information of 120 minutes, which are indicative of the time to empty measurements at those milestones from the example milestone estimation determiner 525 included in the example milestone prediction estimator 155 of FIG. 5. In some examples, the milestone estimation determiner 525 estimates time to empty measurements for a material in the machine 105 (e.g., a chemical for spraying, seeds for planting, etc.). For example, at the example first milestone 1006, the milestone estimation determiner 525 predicts the material included in the machine 105 will be empty in 150 minutes. In examples disclosed herein, the display 1000 is updated as the machine 105 moves along the project path 1004, and the example milestone prediction estimator 155 adjusts the milestone markers (e.g., the first milestone 1006 and the second milestone 1008) based on the geographical location and other sensor(s) data from the machine 105.

While an example manner of implementing the vehicle prediction network 115 of FIG. 1 is illustrated in FIGS. 2-5, one or more of the elements, processes and/or devices illustrated in FIGS. 2-5 may be combined, divided, rearranged, omitted, eliminated and/or implemented in any other way. Further, the example equipment sensor interface 140, the example GNSS receiver 145, the example fuel estimator 150, the example milestone prediction estimator 155, the example satellite interface 205, the example aerial image processor 210, the example offline model calculator 215, the example online model calculator 225, the example fuel estimator determiner 230, the example heading determiner 505, the example implement determiner 510, the example prescription interface 515, the example milestone estimation determiner 525 and/or, more generally, the example vehicle prediction network 115 of FIG. 1 may be implemented by hardware, software, firmware and/or any combination of hardware, software and/or firmware. Thus, for example, any of the example equipment sensor interface 140, the example GNSS receiver 145, the example fuel estimator 150, the example milestone prediction estimator 155, the example satellite interface 205, the example aerial image processor 210, the example offline model calculator 215, the example online model calculator 225, the example fuel estimator determiner 230, the example heading determiner 505, the example implement determiner 510, the example prescription interface 515, the example milestone estimation determiner 525 and/or, more generally, the example vehicle prediction network 115 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example equipment sensor interface 140, the example GNSS receiver 145, the example fuel estimator 150, the example milestone prediction estimator 155, the example satellite interface 205, the example aerial image processor 210, the example offline model calculator 215, the example online model calculator 225, the example fuel estimator determiner 230, the example heading determiner 505, the example implement determiner 510, the example prescription interface 515, and/or the example milestone estimation determiner 525 is/are hereby expressly defined to include a non-transitory computer readable storage device or storage disk such as a memory, a digital versatile disk (DVD), a compact disk (CD), a Blu-ray disk, etc. including the software and/or firmware. Further still, the example vehicle prediction network 115 of FIG. 1 may include one or more elements, processes and/or devices in addition to, or instead of, those illustrated in FIGS. 2-5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the vehicle prediction network 115 of FIG. 1 are shown in FIGS. 11-18. The machine readable instructions may be one or more executable programs or portion(s) of an executable program for execution by a computer processor and/or processor circuitry, such as the processor 1912 shown in the example processor platform 1900 discussed below in connection with FIG. 19. The program may be embodied in software stored on a non-transitory computer readable storage medium such as a CD-ROM, a floppy disk, a hard drive, a DVD, a Blu-ray disk, or a memory associated with the processor 1912, but the entire program and/or parts thereof could alternatively be executed by a device other than the processor 1912 and/or embodied in firmware or dedicated hardware. Further, although the example program is described with reference to the flowcharts illustrated in FIGS. 11-18, many other methods of implementing the example vehicle prediction network 115 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 11-18 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 11:
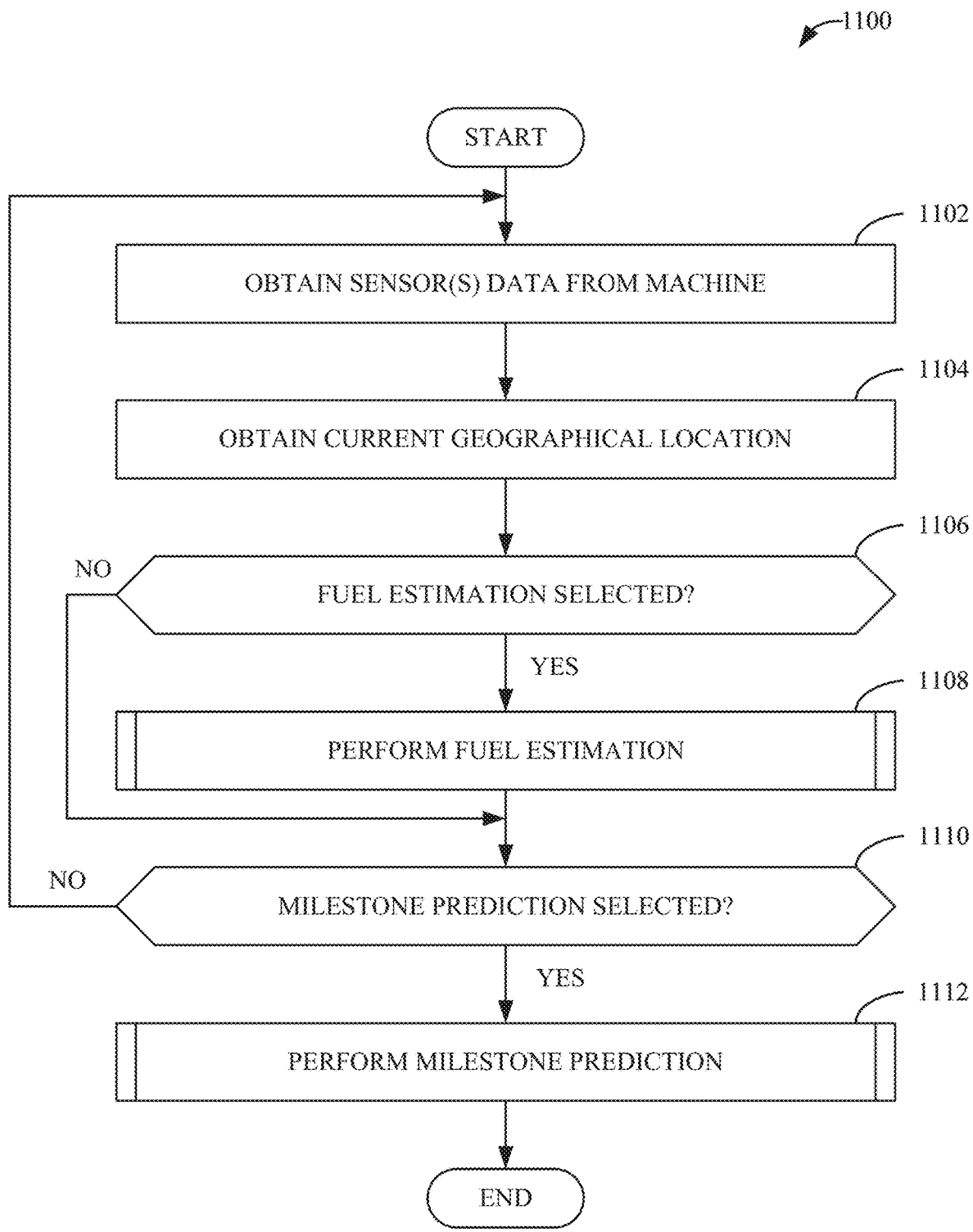
FIG. 11 is a flowchart representative of machine readable instructions which may be executed to implement the example vehicle prediction network included in the example environment of FIG. 1.

FIG. 11 is a flowchart representative of machine readable instructions 1100 which may be executed to implement the example vehicle prediction network 115 included in the example environment 100 of FIG. 1. The program 1100 of FIG. 11 begins execution at block 1102 at which the example equipment sensor interface 140 obtains sensor(s) data from the machine. In some examples, the equipment sensor interface 140 obtains sensor(s) data from the example sensors 125 included in the machine 105 of FIG. 1. The example equipment sensor interface 140 communicates with the sensors 125 to obtain data representative of the velocity, direction, fuel usage, tank volume, material release rate, etc. of the machine 105. In some examples disclosed herein, the equipment sensor interface 140 may communicate via any suitable wired and/or wireless communication method to obtain machine 105 sensor data from the sensors 125. In examples disclosed herein, the equipment sensor interface 140 transmits the sensor(s) data of the machine 105 to the example fuel estimator 150 and the example milestone prediction estimator 155.

At block 1104, the example GNSS receiver 145 obtains the current geographical location of the machine 105. In some examples, the GNSS receiver 145 obtains the current geographical location from the satellite 130 of FIG. 1. In some examples, the GNSS receiver 145 samples the geographical location of the machine 105 at a threshold interval. For example, every 0.1 seconds, the GNSS receiver 145 may obtain the geographical location of the machine 105. In examples disclosed herein, the GNSS receiver 145 transmits the geographical location data of the machine 105 to the example fuel estimator 150 and the example milestone prediction estimator 155.

At block 1106, the example user interface 120 determines if fuel estimation is selected. In some examples, the user interface 120 is an interactive display in which a user/operator may select and/or enter desired inputs (e.g., select a screen display, select a desired prediction system, enter desired vehicle speed, enter implement working width, power on and/or off the vehicle, etc.) before, during, and/or after operation of the machine 105. For example, a user/operator may indicate to the vehicle prediction network 115, via the user interface 120, that fuel estimation is desired (e.g., may indicate to initiate the fuel estimation). If the example user interface 120 determines fuel estimation is selected, then program 1100 continues to block 1108 at which the example fuel estimator 150 performs fuel estimation. In some examples, the example fuel estimator 150 obtains aerial images of the field from the example satellite 130 to calculate yield, area of operation, number of turns, terrain structure, etc. for the field of operation. The example fuel estimator 150 uses the information calculated from the aerial images to calculate fuel consumption using machine learning models. The example fuel estimator 150 uses past operation data (e.g., historic data) to train the machine learning models, which develop the relation between the field data and the fuel consumed during operation. The example fuel estimator 150 uses a run time machine learning model to estimate the fuel consumption with determined number of stops, turn speed, and engine load during stops along with other parameters from real time data during the operation of the agricultural machine. Additional description of the instructions represented by block 1108 is provided below in connection with FIG. 12.

If the example user interface 120 determines fuel estimation is not selected, then program 1100 continues to block 1110 at which the example user interface 120 determines if milestone prediction is selected. In some examples, a user/operator may indicate to the vehicle prediction network 115, via the user interface 120, that milestone prediction is desired (e.g., may indicate to initiate the milestone prediction for a resource included in the machine 105). If the example user interface 120 determines milestone prediction is not selected, then program 1100 returns to start and waits to obtain more sensor(s) data from the machine.

If the example user interface 120 determines milestone prediction is selected, then program 1100 continues to block 1112 at which the example milestone prediction estimator 155 performs milestone prediction. In some examples, the example milestone prediction estimator 155 estimates milestone prediction for the emptying of resources (e.g., chemical, seeds, slurry, etc.) from the machine 105. The example milestone prediction estimator 155 uses machine sensor information from the example equipment sensor interface 140, prescription information for the field of operation, and the vehicle heading to determine milestones on a projected path of the machine 105 that identify predictions for how much of the resource will be available at that milestone, a time until the resource tank is empty at that milestone, etc. Examples disclosed herein predict milestones for resource usage for different field operations (e.g., spreading, spraying, slurry applicator, planting/seeding, etc.). Additional description of the instructions represented by block 1112 is provided below in connection with FIG. 15. After block 1112, program 1100 ends.

Figure 12:
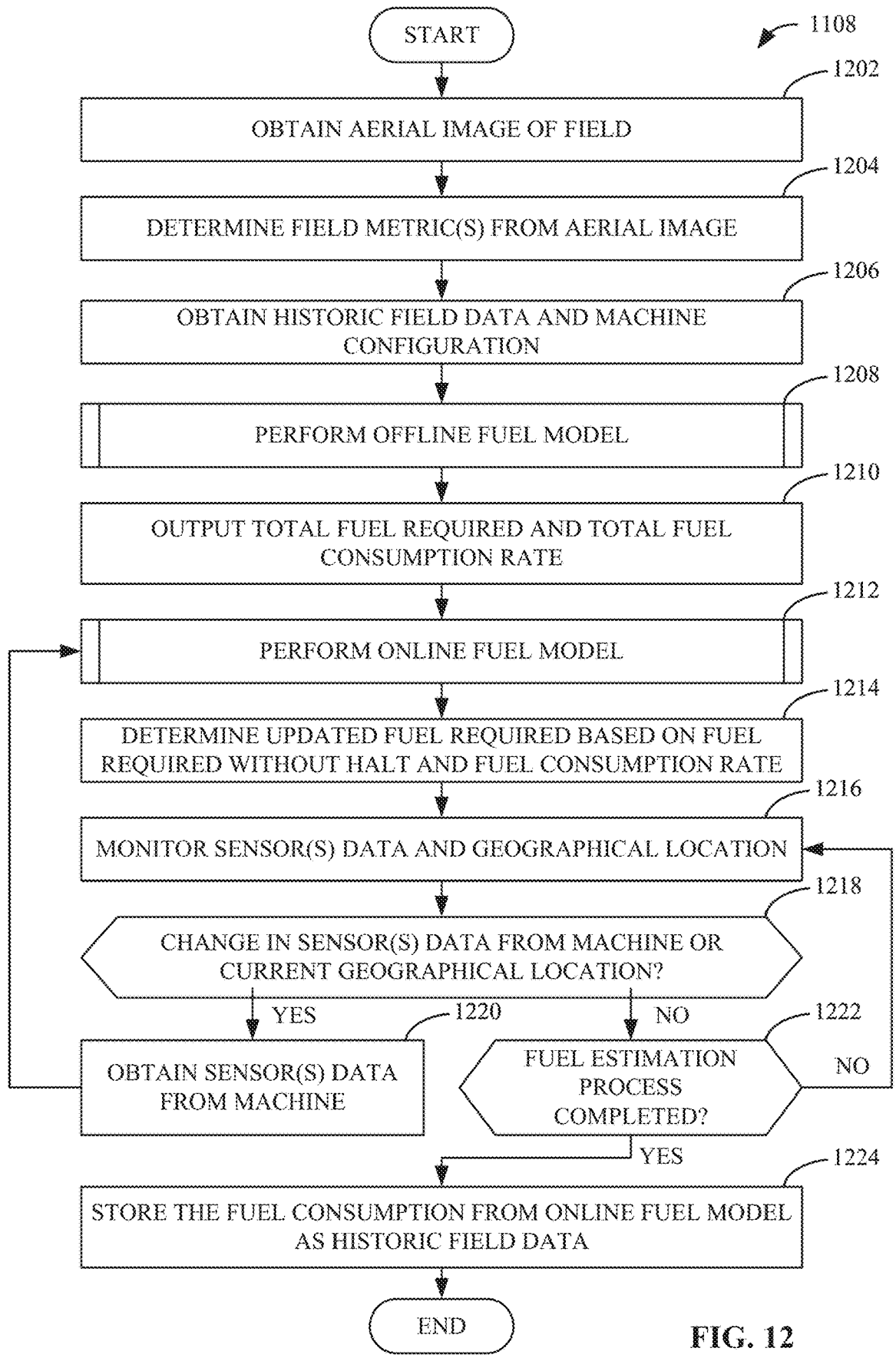
FIG. 12 is a flowchart representative of machine readable instructions which may be executed to implement the example fuel estimator of FIGS. 1 and/or 2.

FIG. 12 is a flowchart representative of machine readable instructions 1108 which may be executed to implement the example fuel estimator 150 of FIGS. 1 and/or 2. The program 1108 of FIG. 12 begins execution at block 1202 at which the example satellite interface 205 obtains an aerial image of the field. In some example examples, the satellite interface 205 obtains the aerial image from a satellite (e.g., the example satellite 130 of FIG. 1). In some examples, the example satellite interface 205 obtains an aerial image of the field the machine 105 is operating on from the example satellite 130 of FIG. 1. In some examples, the satellite interface 205 is in communication with the example network 135 of FIG. 1 to obtain the aerial images from satellite 130. In some examples, the satellite interface 205 obtains the aerial image of the field from an unmanned aerial vehicles (e.g., a drone). In some examples, the satellite interface 205 determines the current geographical location of the machine 105 to determine the aerial image of the field that machine 105 is located in. In some examples, the satellite interface 205 sends a request to the network 135 to obtain the aerial image. In some examples, the satellite interface 205 obtains a current aerial image of the field (e.g., in real time of the request to the network 135).

At block 1204, the example aerial image processor 210 determines the field metric(s) from the aerial image. In some examples, the example aerial image processor 210 determines the field metric(s) from the aerial image data obtained by the satellite interface 205. In some examples, the aerial image processor 210 determines the area of the field, the number of turns in the field, the number of stoppages in the field, the topography of the field, etc. from the aerial image of the field.

At block 1206, the example offline model calculator 215 obtains historic field data and the machine configuration. In some examples, the example offline model calculator 215 obtains historic field data from the example field database 220. In some examples, the example field database 220 is configured to store metrics of the field and/or any other fields during previous operations. For example, the field database 220 includes previous values for area of the field and/or other fields, the number of turns in the field and/or in other fields, the number of stoppages in the field and/or in other fields, the topography of the field and/or other fields, etc. from a previous operation of the machine 105. Additionally, the field database 220 includes previous total fuel required and the total fuel consumption rates from previous operation of the machine corresponding with the previous field metrics during that operation. In some examples, the example offline model calculator 215 also obtains the machine configuration data and machine properties for the machine 105.

At block 1208, the example offline model calculator 215 performs an offline fuel model. In some examples, the offline model calculator 215 performs an offline fuel model using the historic field data obtained from the field database 220. In some examples, the offline model calculator 215 performs the offline fuel model once before operation of the machine 105 has begun. The offline model calculator 215 determines a fuel required without halt and a fuel consumption rate using the historic field data, the current field metric(s) determined by the example aerial image processor 210, and the sensor(s) data from the example equipment sensor interface 140 of FIG. 1 before operation. In examples disclosed herein, the operation is a harvesting event. However, the operation may include other agriculture operations such as, planting/seeding, spraying, etc. Additional description of the instructions represented by block 1208 is provided below in connection with FIG. 13.

At block 1210, the example offline model calculator 215 outputs the total fuel required and the total fuel consumption rate. In some examples, the example offline model calculator 215 outputs the total fuel required and the total fuel consumption rate to the example online model calculator 225 before the operation of the machine 105.

At block 1212, the example online model calculator 225 performs an online fuel model. In some examples, the example online model calculator 225 collects the fuel required without halt and the fuel consumption rate from the example offline model calculator 215, the online model calculator 225 collects the current field metric(s) determined by the example aerial image processor 210. The example online model calculator 225 performs an online fuel model to determine an updated fuel required without halt and fuel consumption rate based on the fuel required without halt and the fuel consumption rate from the offline model calculator 215, the current field metric(s), the real time sensor(s) data from the example equipment sensor interface 140 of FIG. 1, and the real time geographical location data from the example GNSS receiver 145 of FIG. 1. In examples disclosed herein, the example online model calculator 225 collects the sensor(s) data from the equipment sensor interface 140 and the geographical location data from the GNSS receiver 145 in real time during operation, and determines updated fuel required without halt and fuel consumption rate values while the machine 105 operates on a field. Additional description of the instructions represented by block 1212 is provided below in connection with FIG. 14.

At block 1214, the example fuel estimation determiner 230 determines the updated fuel required based on the fuel required without halt and fuel consumption rate. In some examples, the example fuel estimation determiner 230 determines an updated, total amount of fuel required for the machine 105 during operation in real time. The example fuel estimation determiner 230 determines the total fuel required using Equation 1 below.

Total=fuel required w/o halts+(fuel consumption rate during halt*halt time)   (Equation 1)

The example fuel estimation determiner 230 multiplies the fuel consumption rate from the online model calculator 225 by the halt time one the field in real time and combines (sums) the result with the example fuel required without halts from the online model calculator 225. In examples disclosed herein the total fuel required estimates the fuel consumption and wastage of fuel during halt time. In some examples, the fuel estimation determiner 230 output the updated, total amount of fuel required for the machine to the user interface 120. In some examples, the fuel estimation determiner 230 uses the total amount of fuel required to schedule fuel delivery for the machine 105 (e.g., at what points will fuel need to be replenished on the field, etc.).

At block 1216, the example fuel estimation determiner 230 monitors sensor(s) data and the geographical location. In some examples, the example fuel estimation determiner 230 monitors for new sensor(s) data from the equipment sensor interface 140 and/or new geographical location data from the GNSS receiver 145 during operation. At block 1218, the example fuel estimation determiner 230 determines if there is a change in the sensor(s) data from the machine or in the current geographical location. If the example fuel estimation determiner 230 determines there is a change in the sensor(s) data from the machine and/or in the current geographical location, then program 1108 continues to block 1220 at which the example online model calculator 225 obtains sensor(s) data from the machine. After block 1220 completes, program 1108 returns to block 1212 at which the example online model calculator 225 performs the online fuel model.

If the example fuel estimation determiner 230 determines there is no change in the sensor(s) data from the machine and in the current geographical location, then program 1108 continues to block 1222 at which the example user interface 120 determines if the fuel estimation process is completed. For example, the user interface 120 may include a button or indicator for an operator to select to complete the fuel estimation process. In such examples, the user interface 120 communicates whether the fuel estimation process is completed or not to the example fuel estimation determiner 230. If the example user interface 120 determines the fuel estimation process is not completed, then program 1108 returns to block 1218 at which the example fuel estimation determiner 230 monitors the sensor(s) data and the geographical location. If the example user interface 120 determines the fuel estimation process is completed, then program 1108 continues to block 1224 at which the example fuel estimation determiner 230 stores the fuel consumption from the online fuel model as historic field data. In examples disclosed herein, the fuel estimation determiner 230 stores the fuel consumption from the online fuel model of the example online model calculator 225 in the example field database 220 as historic field data for the next operation of the machine 105. After block 1224, program 1108 completes and returns to program 1100 of FIG. 11.

Figure 13:
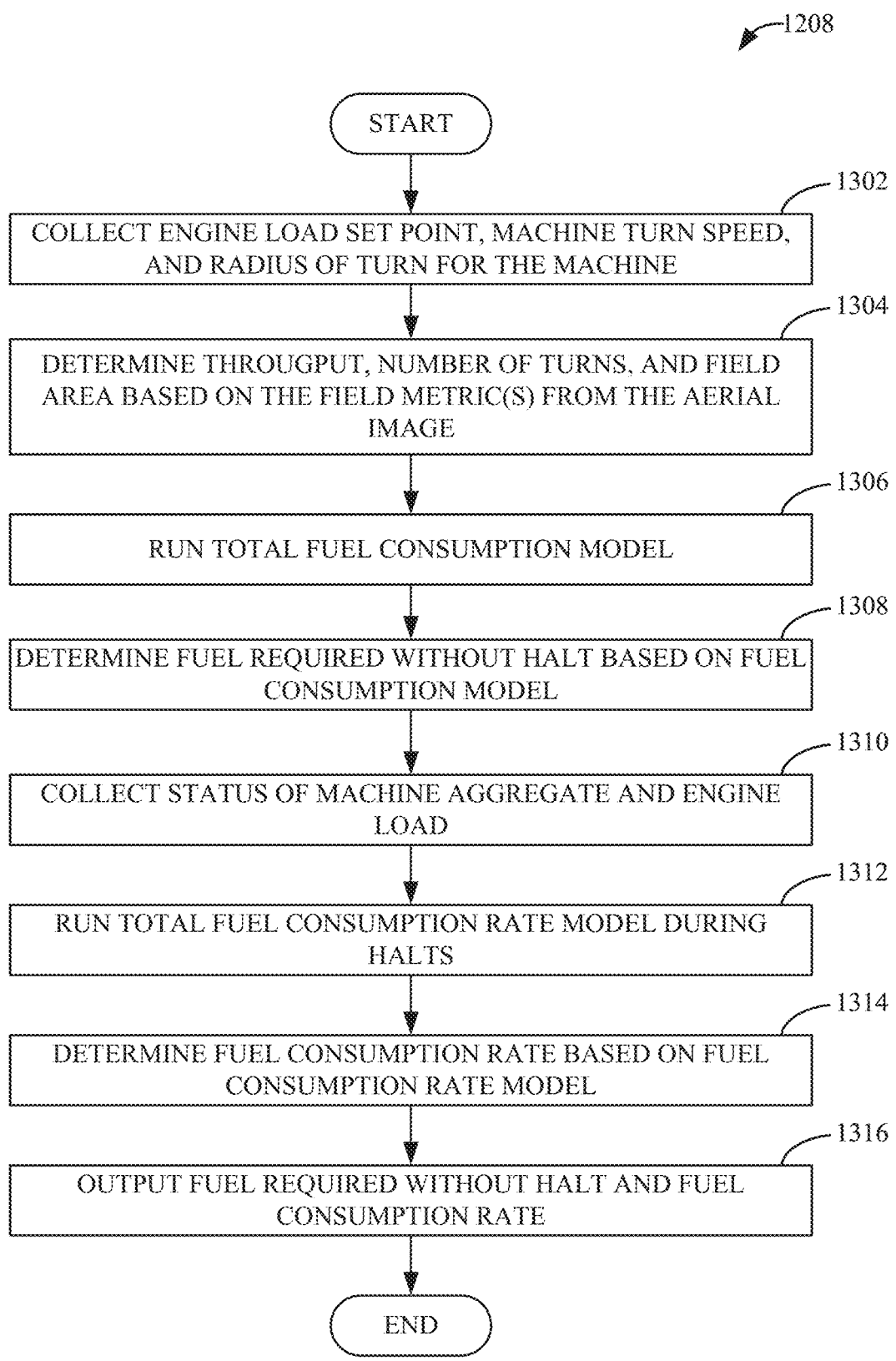
FIG. 13 is a flowchart representative of machine readable instructions which may be executed to implement the example offline model calculator of FIGS. 2 and/or 3.

FIG. 13 is a flowchart representative of machine readable instructions 1208 which may be executed to implement the example offline model calculator 215 of FIGS. 2 and/or 3. The program 1208 of FIG. 13 begins execution at block 1302 at which the example total fuel consumption model 302 collects the engine load set point, the machine turn speed, and radius of turn for the machine. In some examples, the example total fuel consumption model 302 collects the engine load set point, the machine set turn speed, and radius of turn for the machine 105 from the example user interface 120 of FIG. 1. In some examples, the user interface 120 include input fields for an operator to input the engine load set point, the machine set turn speed, and the radius of turn for the machine 105.

At block 1304, the example total fuel consumption model 302 determines total throughput, the number of turns, and the field area based on the field metric(s) from the aerial image. In some examples, the example total fuel consumption model 302 obtains the field metric(s) from the aerial image via the example aerial image processor 210 of FIG. 2. In some examples, the total fuel consumption model 302 determines the total throughput, the number of turns on the field, and the field area from the field metrics(s) determined from the aerial image. In some examples, the example total fuel consumption model 302 obtains the historic field data from the field database 220. In some examples, the historic field data includes previous values for area of the field, the number of turns in the field, the number of stoppages in the field, the topography of the field, etc. associated with previous total fuel required and the total fuel consumption rates the from a previous operation of the machine 105.

At block 1306, the example total fuel consumption model 302 runs the total fuel consumption model. In some examples, the example total fuel consumption model 302 runs the total fuel consumption model with the inputs of the engine load set point, the machine set turn speed, the radius of turn for the machine 105, total throughput, the number of turns on the field, the field area, and the historic field data from example field database 220. In some examples, the total fuel consumption model is a machine learning model that uses the historic field data (e.g., the fuel consumed during previous operation), the field metric(s), and the machine properties (e.g., engine load set point, the machine set turn speed, the radius of turn for the machine 105) to determine the relation between the field data and the fuel consumed during operation.

At block 1308, the example total fuel consumption model 302 determines the fuel required without halt based on the fuel consumption model. In some examples, the example fuel required without halt 304 illustrates the amount of total fuel needed for the machine 105 to perform an operation on the field it is located in without any halts (e.g., stoppages). In examples disclosed herein, halts during operation indicate when the machine 105 stops during operation (e.g., for loading/unloading materials, etc.).

At block 1310, the example fuel consumption rate model 306 collects the status of the machine aggregate and engine load. In some examples, the example fuel consumption rate model 306 collects the status of the machine aggregate (e.g., the example implement 110 of FIG. 1) and the engine load for the machine 105. In some examples, the engine load depends on the characteristic of the machine 105, the configuration of the machine 105, the operating speed, types of crop and the conditions, the type of operation, total throughput, topography, etc. In some examples, the example fuel consumption rate model 306 obtains the historic field data from the field database 220. In some examples, the historic field data includes previous values for area of the field, the number of turns in the field, the number of stoppages in the field, the topography of the field, etc. associated with previous total fuel required and the total fuel consumption rates the from a previous operation of the machine 105.

At block 1312, the example fuel consumption rate model 306 runs the total fuel consumption rate model during halts. In some examples, the example fuel consumption rate model 306 runs the total fuel consumption rate model during halts based on the inputs of the status of the machine aggregate, the engine load, and the historic field data (e.g., the fuel consumed during halt (stoppage) of a pervious operation). In some examples, the total fuel consumption rate model during halts is a machine learning model that uses the status of machine aggregate, the engine load, and the historic field data to determine the relation between the characteristics of the machine 105 and field data with the fuel consumed during halt time of an operation. In some examples, the fuel consumption rate model 306 may determine a minimum number of required halts (e.g., for loading/unloading) during the operation based on the throughput and an input size of the materials tank for the machine 105.

At block 1314, the example fuel consumption rate model 306 determines the fuel consumption rate based on the fuel consumption rate model. In some examples, the example fuel consumption rate model 306 determines the example fuel consumption rate 308 based on the total fuel consumption rate model during halts. In some examples, the fuel consumption rate 308 illustrates the rate the fuel is consumed by the machine 105 to perform an operation on the field it is located in. At block 1316, the example offline model calculator 215 outputs the fuel required without halt and fuel consumption rate. After block 1316, program 1208 completes and returns to program 1108 of FIG. 12.

Figure 14:
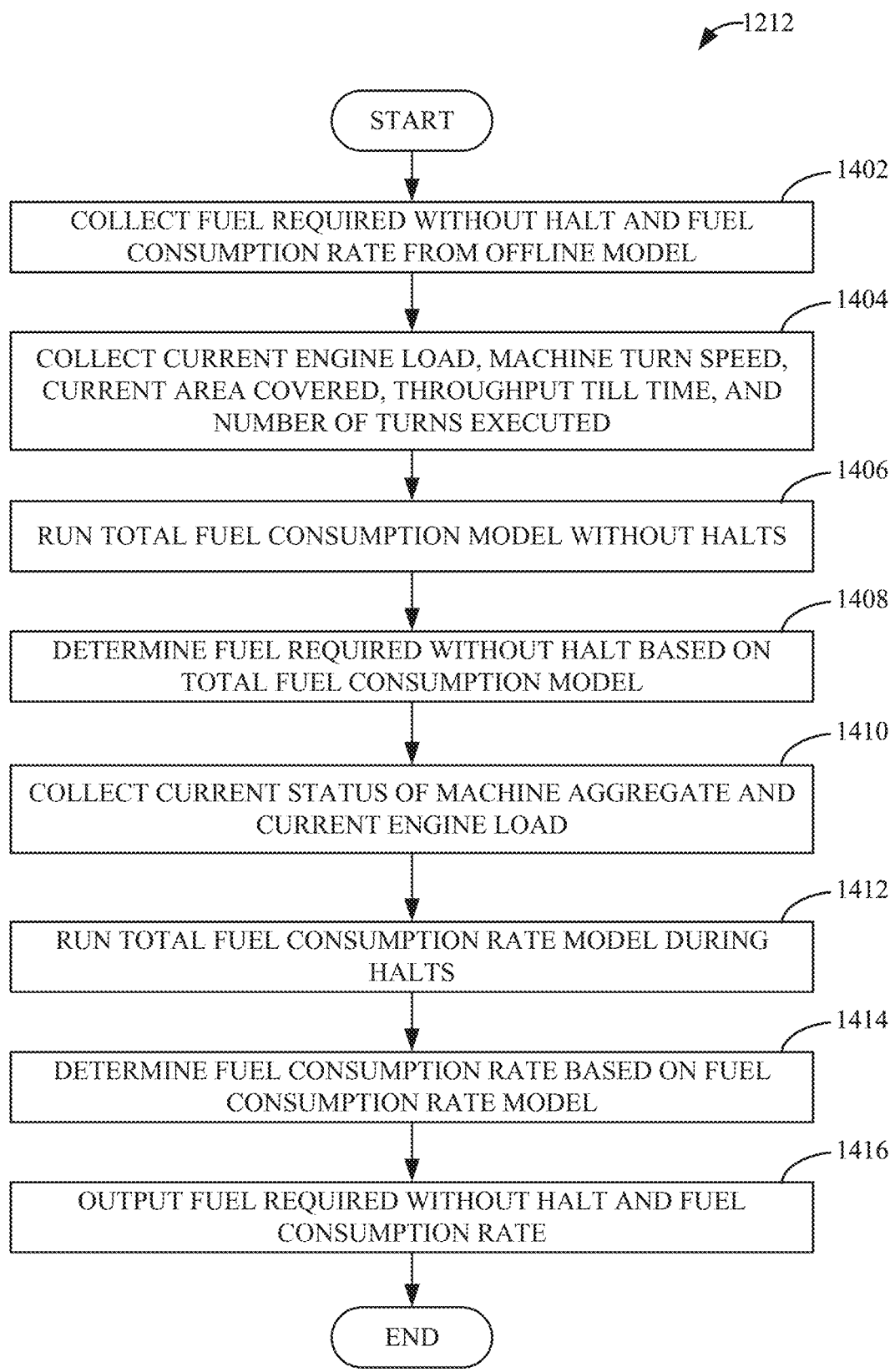
FIG. 14 is a flowchart representative of machine readable instructions which may be executed to implement the example online model calculator of FIGS. 2 and/or 4.

FIG. 14 is a flowchart representative of machine readable instructions 1212 which may be executed to implement the example online model calculator 225 of FIGS. 2 and/or 4. The program 1212 of FIG. 14 begins execution at block 1402 at which the example online model calculator 225 collects fuel requires without halt and the fuel consumption rate from the offline model. At block 1404, the example total fuel consumption model 402 collects the current engine load, the machine turn speed, the current area covered, the throughput till time, and the number of turns executed. In some examples, the example total fuel consumption model 402 collects information from the example equipment sensor interface 140 of FIG. 1 in real time during operation of the machine 105. The example total fuel consumption model 402 collects the current engine load, the machine turn speed, the current area covered, the throughput till time, the number of turns executed, number of times tank on the machine 105 is unloaded, etc. based on the information from the equipment sensor interface 140.

At block 1406, the example total fuel consumption model 402 runs the total fuel consumption model without halts. In some examples, the example total fuel consumption model 402 runs the total fuel consumption model without halts using the inputs of the current engine load, the machine turn speed, the current area covered, the throughput till time, the number of turns executed, number of times tank on the machine 105 is unloaded, etc. collected in real time from the equipment sensor interface 140. In some examples, the total fuel consumption model is a machine learning model that uses the input data to determine the relation between the field data and data of the machine 105 with the fuel consumed during operation in real time.

At block 1408, the example total fuel consumption model 402 determines fuel required without based on the total fuel consumption model. In some examples, the total fuel consumption model 402 obtains the example fuel required without halt 304 of FIG. 3 from the example offline model calculator 215. In some examples, the total fuel consumption model 402 compares the current fuel required without halts to the example fuel required without halt 304 to determine the example fuel required without halts 404. The example fuel required without halt 404 illustrates the amount of total fuel needed for the machine 105 to perform an operation on the field it is located in without any halts (e.g., stoppages) based on the current, real time data collected from the machine 105.

At block 1410, the example fuel consumption rate model 406 collects the current status of machine aggregate and current engine load. In some examples, the example fuel consumption rate model 406 collects the current status of machine aggregate (e.g., the example implement 110 of FIG. 1) and the current engine load for the machine 105. In some examples, the engine load depends on the characteristic of the machine 105, the configuration of the machine 105, the operating speed, types of crop and the conditions, the type of operation, total throughput, topography, etc.

At block 1412, the example fuel consumption rate model 406 runs the total fuel consumption rate model during halts. In some examples, the example fuel consumption rate model 406 runs the total fuel consumption rate model during halts using the inputs of the current status of the machine aggregate and the current engine load collected in real time from the example equipment sensor interface 140. In some examples, the fuel consumption rate model during halts is a machine learning model that uses the input data to determine the relation between the characteristics of the machine 105 and field data with the fuel consumed during halt time of an operation in real time.

At block 1414, the example fuel consumption rate model 406 determines the fuel consumption rate based on the fuel consumption rate model. In some examples, the example fuel consumption rate model 406 obtains the example fuel consumption rate 308 of FIG. 3 from the example offline model calculator 215. In some examples, the fuel consumption rate model 406 compares the current fuel consumption rate to the example fuel consumption rate 308 to determine the example fuel consumption rate 408. The example fuel consumption rate 408 illustrates the rate the fuel is consumed by the machine 105 to perform an operation on the field including halts (e.g., stoppages) based on the current, real time data collected from the machine 105. At block 1416, the example online model calculator 315 outputs the fuel required without halt and fuel consumption rate. At block 1416, program 1212 completes and returns to program 1108 of FIG. 12.

Figure 15:
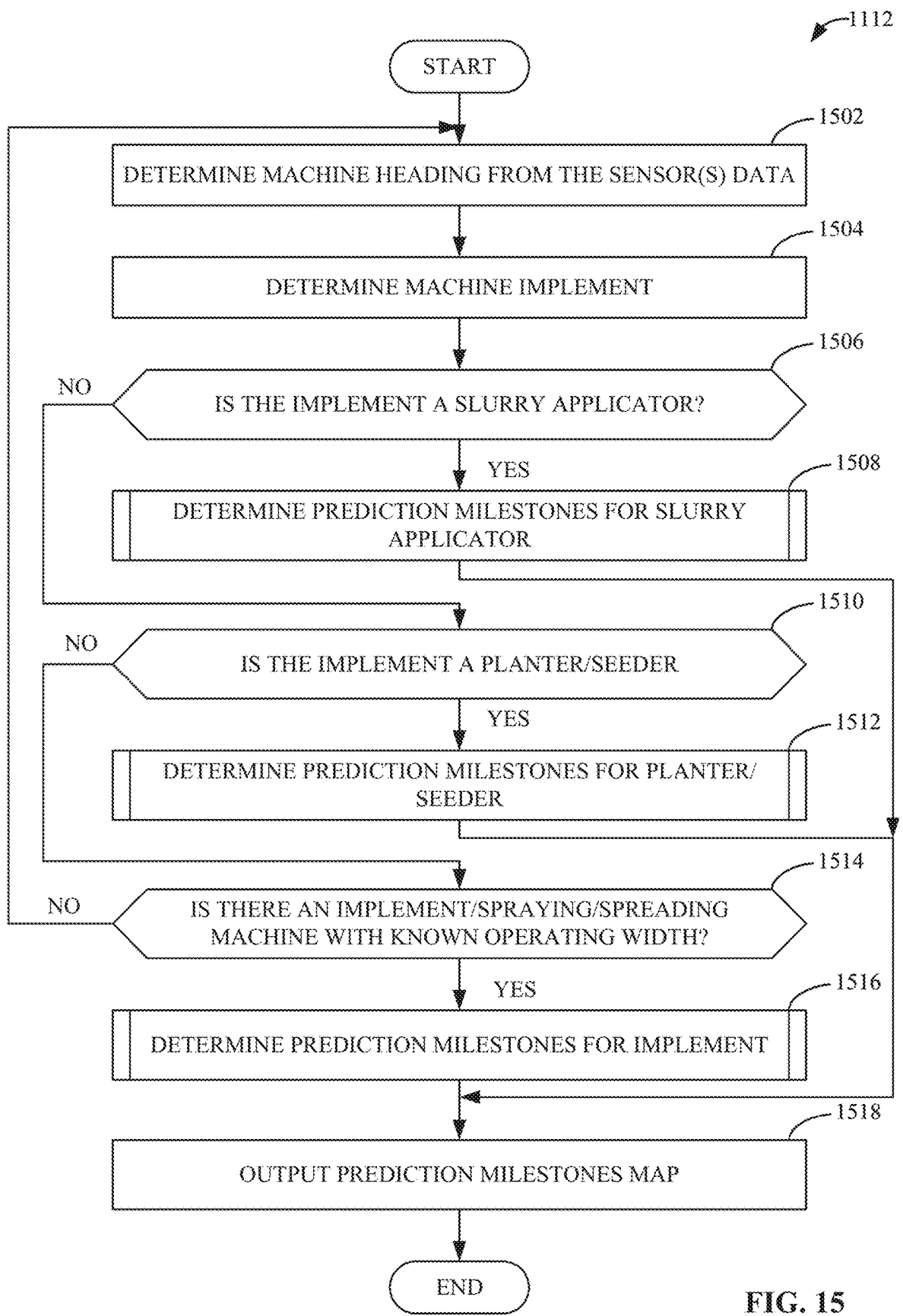
FIG. 15 is a flowchart representative of machine readable instructions which may be executed to implement the example milestone prediction estimator of FIGS. 1 and/or 5.

FIG. 15 is a flowchart representative of machine readable instructions 1112 which may be executed to implement the example milestone prediction estimator 155 of FIGS. 1 and/or 5. The program 1112 of FIG. 15 begins execution at block 1502 at which the example heading determiner 505 determines the machine heading from the sensor(s) data. In some examples, the example heading determiner 505 determines the heading (e.g., the angular direction the nose of the machine 105 is facing) based on the example sensors 125 of FIG. 1. At block 1504, the example implement determiner 510 determines the machine implement. In some examples, the determines the machine implement (e.g., the example implement 110 of FIG. 1). In some examples, the example user interface 120 of FIG. 1 includes and input field for the operator to specify the type of the example implement 110. In some examples, the implement determiner 510 obtains the information of the type of the implement 110 from the user interface 120.

At block 1506, the example implement determiner 510 determines if the implement is a slurry applicator. If the example implement determiner 510 determines the implement is a slurry applicator, then program 1112 continues to block 1508 at which the example milestone estimation determiner 525 determines the prediction milestones for a slurry applicator. Additional description of the instructions represented by block 1508 is provided below in connection with FIG. 16. If the example implement determiner 510 determines the implement is not a slurry applicator, then program 1112 continues to block 1510 at which the example implement determiner 510 determines if the implement is a planter/seeder. If the example implement determiner 510 determines the implement is a planter/seeders, then program 1112 continues to block 1512 at which the example milestone estimation determiner 525 determines the prediction milestones for the planter/seeder. Additional description of the instructions represented by block 1512 is provided below in connection with FIG. 17.

If the example implement determiner 510 determines the implement is not a planter/seeder, then program 1112 continues to block 1514 at which the example implement determiner 510 determines if there is an implement/spraying/spreading machine with a known operating width. If the example implement determiner 510 determines there is an implement/spraying/spreading machine with a known operating width, then program 1112 continues to block 1516 at which the example milestone estimation determiner 525 determines the prediction milestones for the implement. Additional description of the instructions represented by block 1516 is provided below in connection with FIG. 17. If the example implement determiner 510 determines there is not an implement/spraying/spreading machine with a known operating width, then program 1112 returns to start and waits to determine the machine heading from new sensor(s) data. At block 1518, the example milestone estimation determiner 525 outputs the prediction milestones map. In some examples, the map of the milestones includes indicators of where the milestone positions are with the corresponding values for fuel remaining, distance remaining, time to empty, and/or distance til empty at that position. After block 1518, the program 1112 completes and returns to program 1100 of FIG. 11.

Figure 16:
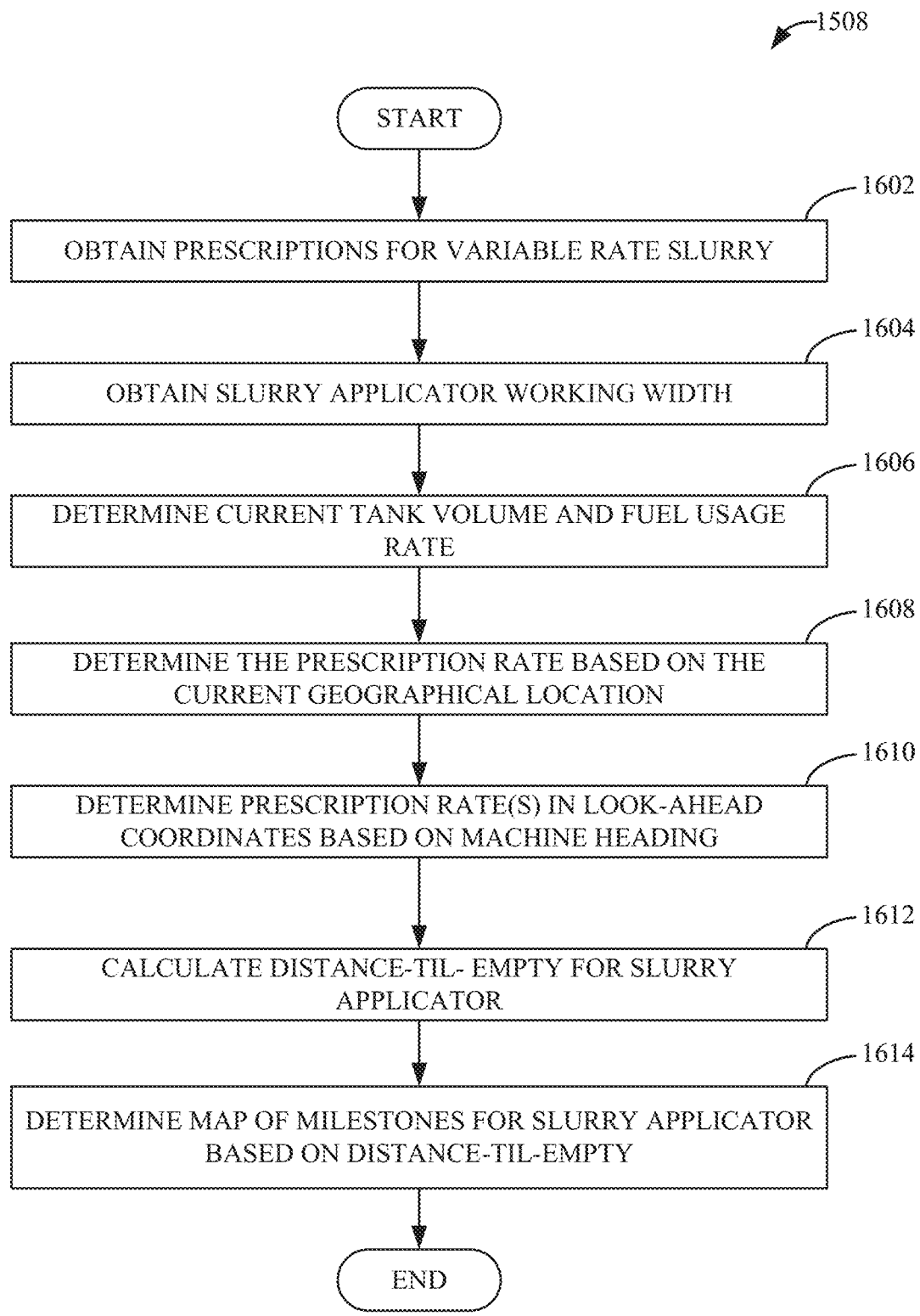
FIG. 16 is a flowchart representative of machine readable instructions which may be executed to implement an example milestone estimation determiner of FIG. 5 for a slurry applicator.

FIG. 16 is a flowchart representative of machine readable instructions 1508 which may be executed to implement an example milestone estimation determiner 525 of FIG. 5 for a slurry applicator. The program 1508 of FIG. 16 begins execution at block 1602 at which the example prescription interface 515 obtains prescriptions for variable rate slurry. In some examples, the prescription interface 515 obtains the prescriptions from the example prescription database 520 based on the geographical location of the field obtained from the example GNSS receiver 145 of FIG. 1. In examples disclosed herein, the prescriptions are used to disperse the resource of the machine 105 (e.g., spray the chemical, spread seeds, etc.) at different rates depending on the different characteristics of the field (e.g., soil content, crop, etc.) in different locations. In examples disclosed herein, the prescriptions are used to adjust dispersal of resources (e.g., chemical, seeds, slurry, etc.) in a field based on the conditions/characteristics of regions within the field. In examples disclosed herein, the prescriptions define a rate at which the implement 110 and/or the machine 105 releases the resources (e.g., chemical, seed, etc.) and/or a rate of speed for the machine 105 to release the resource (e.g., slurry, etc.). The example prescription interface 515 obtains the prescriptions for variable rate slurry in a field based on the type of the implement 110 determined by the example implement determiner 510. In examples of a slurry applicator, the slurry applicator does not have control over variable rate for applying slurry in the field. In such examples, the speed of the machine 105 is controlled (e.g., with the help of a MCS (Manure constituent Sensing) controller) using the prescriptions that define a rate of speed for the machine 105 that are obtained by the example prescription interface 515 to achieve the effective application of slurry.

At block 1604, the example implement determiner 510 obtains the slurry applicator working width. In some examples, the implement determiner 510 obtains the slurry applicator working width that is input by the operator in the example user interface 120. At block 1606, the example implement determiner 510 determines the current tank volume and fuel usage. In some examples, the determines the current tank volume of the slurry and the current fuel usage based on the sensor(s) data from the example equipment sensor interface 140.

At block 1608, the example prescription interface 515 determines the prescription rate based on the current geographical location. At block 1610, the example prescription interface 515 determines the prescription rate(s) in look-ahead coordinates based on the machine heading. At block 1612, the example milestone estimation determiner 525 calculates distance-til-empty for the slurry applicator. In some examples, the example milestone estimation determiner 525 obtains the following inputs: heading information from the heading determiner 505, the working width of the implement (slurry applicator) from the user interface 120, the current geographical location from the GNSS receiver 145, the current tank volume and fuel usage rate from the equipment sensor interface 140, and the prescription rates for the current geographical location and look-ahead coordinates based on the heading from the prescription interface 515. The example milestone estimation determiner 525 uses the inputs to predict the distance-til-empty for various upcoming milestones (e.g., positions along the path the machine 105 is following based on the heading). In some examples, the milestone estimation determiner 525 may additionally or alternatively determine the fuel remaining, distance remaining, and time to empty for the slurry applicator based on the inputs.

At block 1614, the example milestone estimation determiner 525 determines the map of milestones for the slurry applicator based on the distance-til-empty. In some examples, the milestone estimation determiner 525 generates a map of the milestones and outputs the map to the user interface 120. In some examples, the map of the milestones includes indicators of where the milestone positions are with the corresponding values for fuel remaining, distance remaining, time to empty, and/or distance til empty at that position. After block 1614, the program 1508 completes and returns to program 1112 of FIG. 15.

Figure 17:
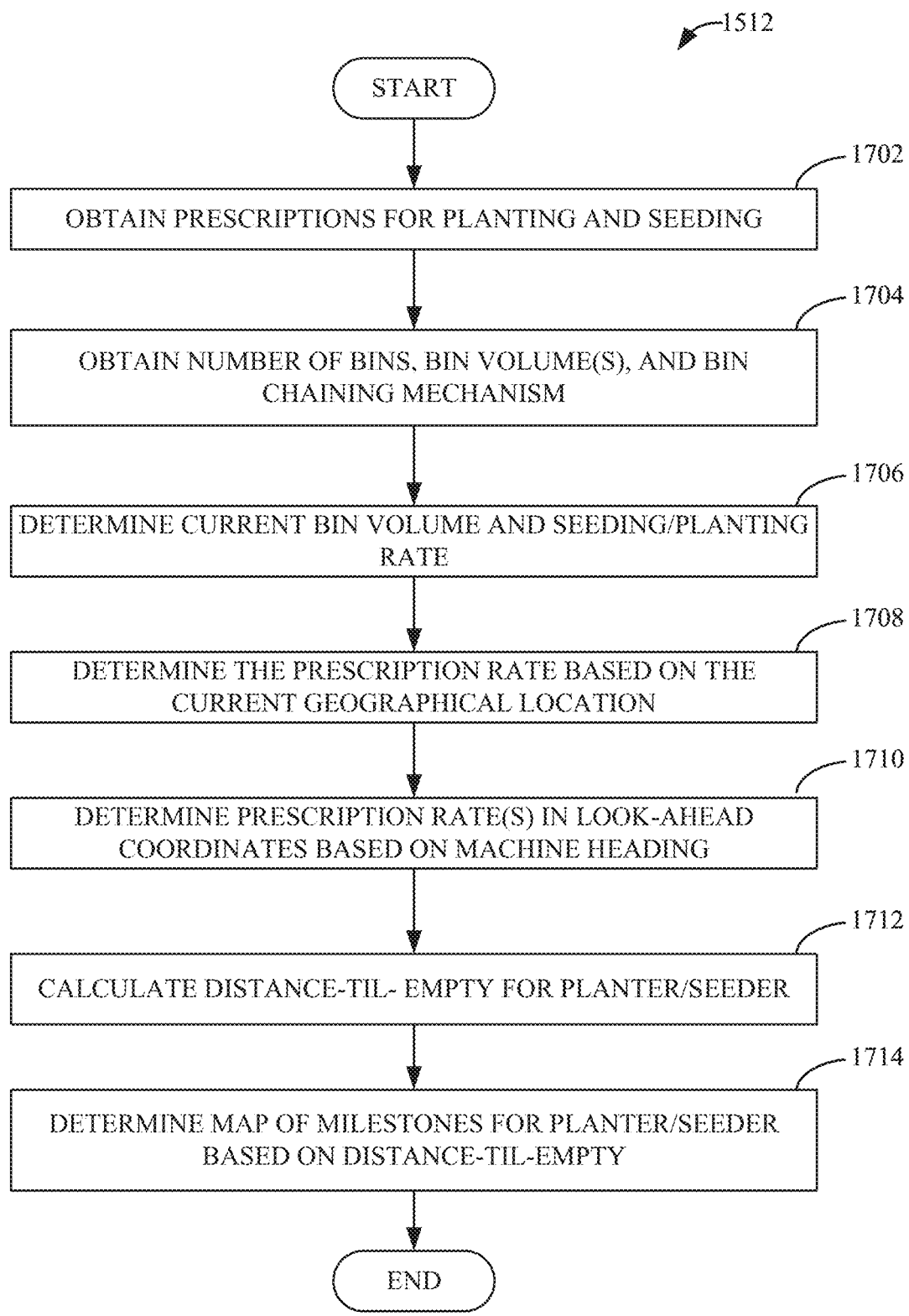
FIG. 17 is a flowchart representative of machine readable instructions which may be executed to implement the example milestone estimation determiner of FIG. 5 for a planter/seeder.

FIG. 17 is a flowchart representative of machine readable instructions 1512 which may be executed to implement the example milestone estimation determiner 525 of FIG. 5 for a planter/seeder. The program 1512 of FIG. 17 begins execution at block 1702 at which the example prescription interface 515 obtains prescriptions for planting and seeding. In some examples, the prescription interface 515 obtains the prescriptions from the example prescription database 520 based on the geographical location of the field obtained from the example GNSS receiver 145 of FIG. 1. In examples disclosed herein, the prescriptions are used to disperse the resource of the machine 105 (e.g., spray the chemical, spread seeds, etc.) at different rates depending on the different characteristics of the field (e.g., soil content, crop, etc.) in different locations. In examples disclosed herein, the prescriptions are used to adjust dispersal of resources (e.g., chemical, seeds, slurry, etc.) in a field based on the conditions/characteristics of regions within the field. The example prescription interface 515 obtains the prescriptions for planning and seeding in a field based on the type of the implement 110 determined by the example implement determiner 510.

At block 1704, the example implement determiner 510 obtains the number of bins, the bin volume(s), and the bin chaining mechanism. In some examples, the implement determiner 510 obtains the number of bins, the bin volume (s), and the bin chaining mechanism from the example user interface 120 and the example equipment sensor interface 140. At block 1706, the example implement determiner 510 determines the current bin volume and seeding/planting rate. At block 1708, the example prescription interface 515 determines the prescription rate based on the current geographical location. At block 1710, the example prescription interface 515 determines the prescription rate(s) in look-ahead coordinates based on the machine heading.

At block 1712, the example milestone estimation determiner 525 calculates distance-til-empty for the planter/seeder. In some examples, the example milestone estimation determiner 525 obtains the following inputs: heading information from the heading determiner 505, the working width of the implement (planter/seeder) and seed bin information (number of bins, their volumes, knowledge of any bin chaining mechanism, etc.) from the user interface 120, the current geographical location from the GNSS receiver 145, the current bin volume and seeding/planting rate from the equipment sensor interface 140, and the prescription rates for the current geographical location and look-ahead coordinates based on the heading from the prescription interface 515. The example milestone estimation determiner 525 uses the inputs to predict the distance-til-empty for various upcoming milestones (e.g., positions along the path the machine 105 is following based on the heading). In some examples, the milestone estimation determiner 525 may additionally or alternatively determine the fuel remaining, distance remaining, and time to empty for the planter/seeder based on the inputs.

At block 1614, the example milestone estimation determiner 525 determines the map of milestones for the planter/seeder based on the distance-til-empty. In some examples, the milestone estimation determiner 525 generates a map of the milestones and outputs the map to the user interface 120. In some examples, the map of the milestones includes indicators of where the milestone positions are with the corresponding values for fuel remaining, distance remaining, time to empty, and/or distance til empty at that position. After block 1714, the program 1512 completes and returns to program 1112 of FIG. 15.

Figure 18:
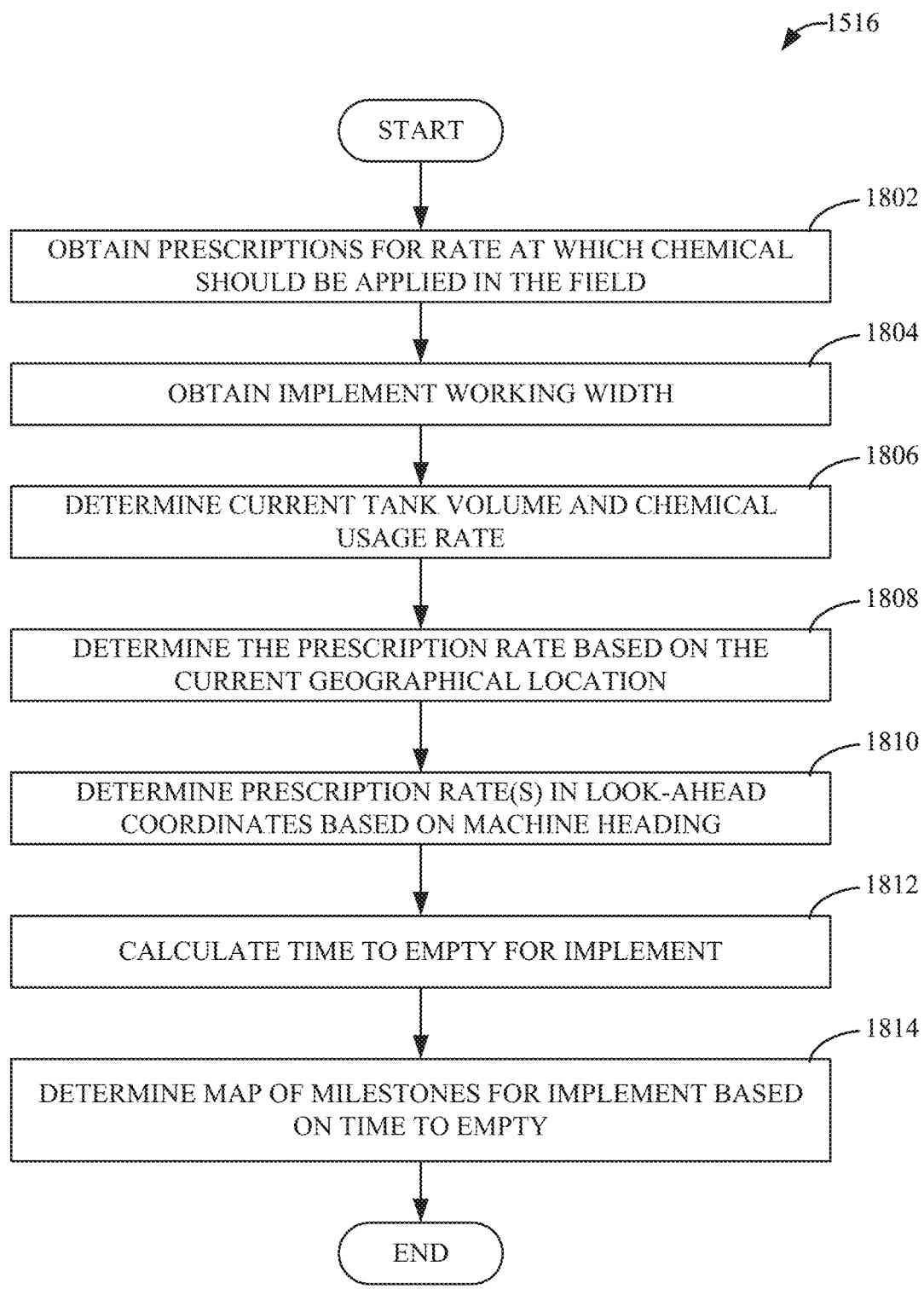
FIG. 18 is a flowchart representative of machine readable instructions which may be executed to implement the example milestone estimation determiner of FIG. 5 for an implement with a known operating width.

FIG. 18 is a flowchart representative of machine readable instructions 1516 which may be executed to implement the example milestone estimation determiner 525 of FIG. 5 for an implement with a known operating width. The program 1516 of FIG. 18 begins execution at block 1802 at which the example prescription interface 515 obtains prescriptions for rate at which chemical should be applied in the field. In some examples, the prescription interface 515 obtains the prescriptions from the example prescription database 520 based on the geographical location of the field obtained from the example GNSS receiver 145 of FIG. 1. In examples disclosed herein, the prescriptions are used to disperse the resource of the machine 105 (e.g., spray the chemical, spread seeds, etc.) at different rates depending on the different characteristics of the field (e.g., soil content, crop, etc.) in different locations. In examples disclosed herein, the prescriptions are used to adjust dispersal of resources (e.g., chemical, seeds, slurry, etc.) in a field based on the conditions/characteristics of regions within the field. The example prescription interface 515 obtains the prescriptions for the rate at which a chemical should be applied in a field based on the type of the implement 110 determined by the example implement determiner 510.

At block 1804, the example implement determiner 510 obtains the implement working width. In some examples, the implement determiner 510 obtains the implement working width that is input by the operator via the user interface 120. At block 1806, the example implement determiner 510 determines the current tank volume and chemical usage rate. In some examples, the implement determiner 510 determines the current tank volume and chemical usage rate based on the sensor(s) data from the equipment sensor interface 140. At block 1808, the example prescription interface 515 determines the prescription rate based on the current geographical location. At block 1810, the example prescription interface 515 determines the prescription rate(s) in look-ahead coordinates based on the machine heading.

At block 1812, the example milestone estimation determiner 525 calculates the time to empty for the implement. In some examples, the example milestone estimation determiner 525 obtains the following inputs: heading information from the heading determiner 505, the working width of the implement from the user interface 120, the current geographical location from the GNSS receiver 145, the current tank volume and chemical usage rate from the equipment sensor interface 140, and the prescription rates for the current geographical location and look-ahead coordinates based on the heading from the prescription interface 515. The example milestone estimation determiner 525 uses the inputs to predict the time to empty for various upcoming milestones (e.g., positions along the path the machine 105 is following based on the heading). In some examples, the milestone estimation determiner 525 may additionally or alternatively determine the fuel remaining, distance remaining, and distance-til-empty for the implement based on the inputs.

At block 1814, the example milestone estimation determiner 525 determines the map of milestones for the implement based on the time to empty. In some examples, the milestone estimation determiner 525 generates a map of the milestones and outputs the map to the user interface 120. In some examples, the map of the milestones includes indicators of where the milestone positions are with the corresponding values for fuel remaining, distance remaining, time to empty, and/or distance til empty at that position. After block 1814, the program 1516 completes and returns to program 1112 of FIG. 15.

Figure 19:
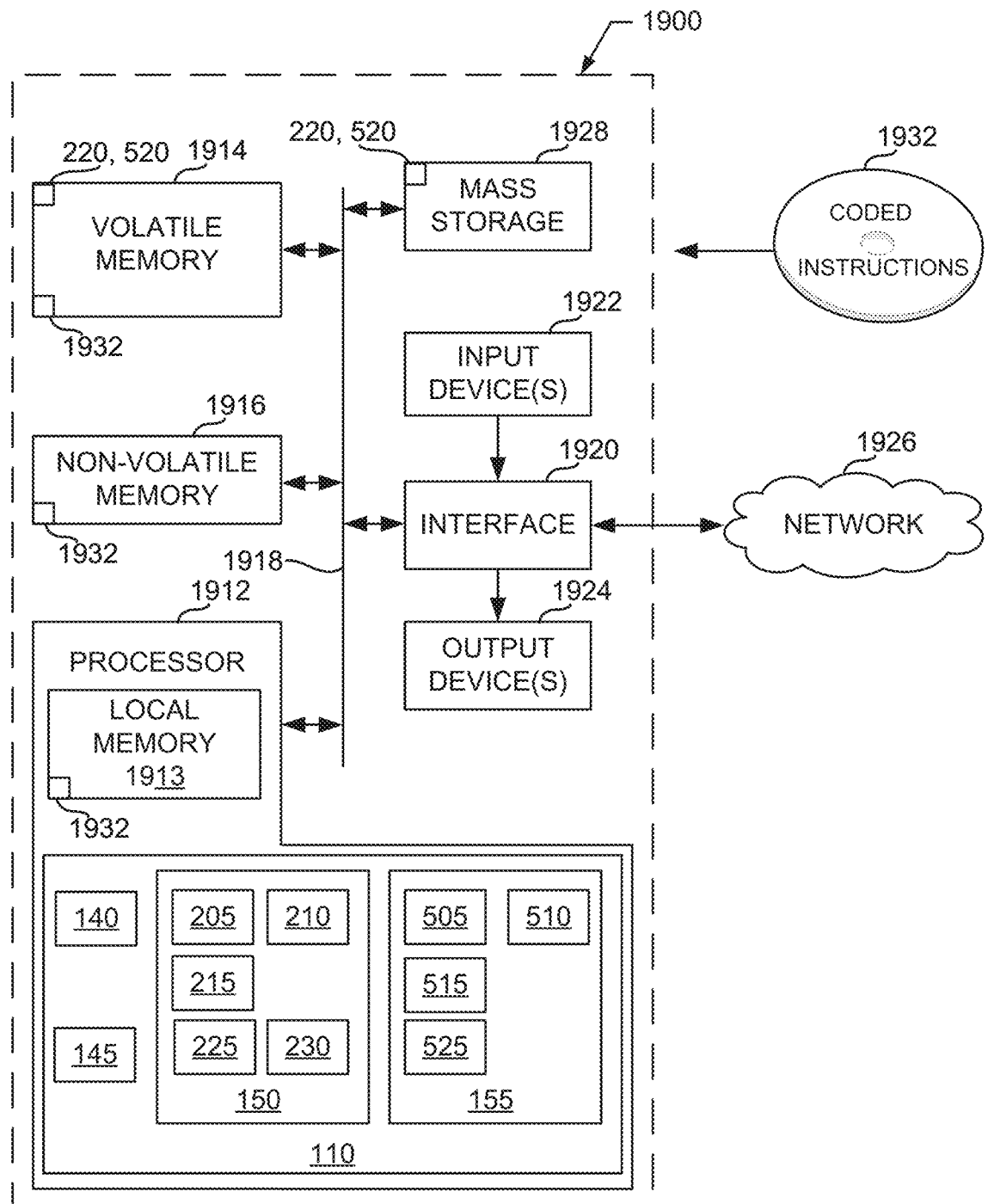
FIG. 19 is a block diagram of an example processing platform structured to execute the instructions of FIG. 3 to implement the example vehicle prediction network included in the example environment of FIG. 1.

FIG. 19 is a block diagram of an example processor platform 1900 structured to execute the instructions of FIGS. 11-18 to implement the example vehicle prediction network 115 of FIG. 1. The processor platform 1900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1900 of the illustrated example includes a processor 1912. The processor 1912 of the illustrated example is hardware. For example, the processor 1912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example equipment sensor interface 140, the example GNSS receiver 145, the example fuel estimator 150, the example milestone prediction estimator 155, the example satellite interface 205, the example aerial image processor 210, the example offline model calculator 215, the example online model calculator 225, the example fuel estimator determiner 230, the example heading determiner 505, the example implement determiner 510, the example prescription interface 515, and the example milestone estimation determiner 525.

The processor 1912 of the illustrated example includes a local memory 1913 (e.g., a cache). The processor 1912 of the illustrated example is in communication with a main memory including a volatile memory 1914 and a non-volatile memory 1916 via a bus 1918. The volatile memory 1914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1916 may be implemented by flash memory and/or any other desired type of memory device. Access to the main memory 1914, 1916 is controlled by a memory controller.

The processor platform 1900 of the illustrated example also includes an interface circuit 1920. The interface circuit 1920 may be implemented by any type of interface standard, such as an Ethernet interface, a universal serial bus (USB), a Bluetooth® interface, a near field communication (NFC) interface, and/or a PCI express interface.

In the illustrated example, one or more input devices 1922 are connected to the interface circuit 1920. The input device(s) 1922 permit(s) a user to enter data and/or commands into the processor 1912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1924 are also connected to the interface circuit 1920 of the illustrated example. The output devices 1924 can be implemented, for example, by display devices (e.g., a light emitting diode -+(LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1920 of the illustrated example, thus, typically includes a graphics driver card, a graphics driver chip and/or a graphics driver processor.

The interface circuit 1920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1900 of the illustrated example also includes one or more mass storage devices 1928 for storing software and/or data. Examples of such mass storage devices 1928 include floppy disk drives, hard drive disks, compact disk drives, Blu-ray disk drives, redundant array of independent disks (RAID) systems, and digital versatile disk (DVD) drives.

The machine executable instructions 1932 of FIGS. 11-18 may be stored in the mass storage device 1928, in the volatile memory 1914, in the non-volatile memory 1916, and/or on a removable non-transitory computer readable storage medium such as a CD or DVD.

Figure 20:
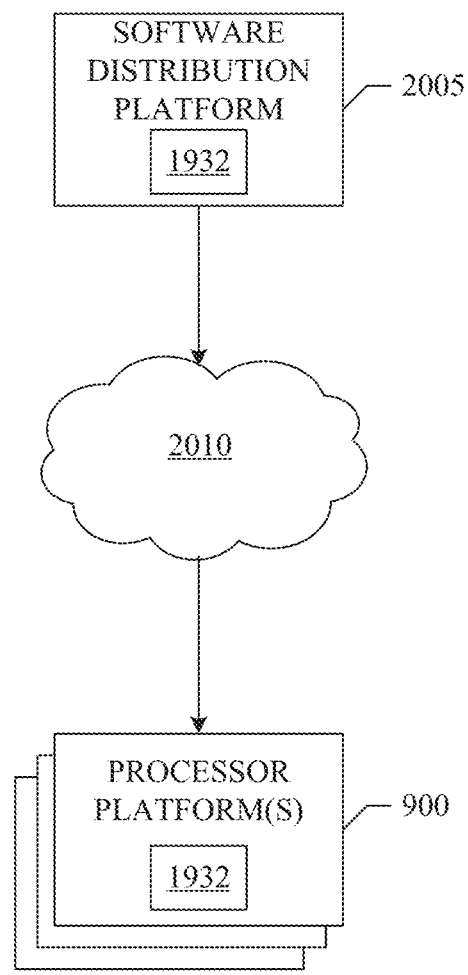
FIG. 20 is a block diagram of an example software distribution platform to distribute software (e.g., software corresponding to the example computer readable instructions of FIGS. 11-18) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 2005 to distribute software such as the example computer readable instructions 1932 of FIG. 19 to third parties is illustrated in FIG. 20. The example software distribution platform 2005 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1932 of FIG. 19. The third parties may be consumers, users, retailers, OEMs, etc., who purchase and/or license the software for use and/or re-sale and/or sub-licensing. In the illustrated example, the software distribution platform 2005 includes one or more servers and one or more storage devices. The storage devices store the computer readable instructions 1932, which may correspond to the example computer readable instructions 1100 of FIGS. 11, 12, 13, 14, 15, 16, 17, and/or 18, as described above. The one or more servers of the example software distribution platform 2005 are in communication with a network 2010, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1932 from the software distribution platform 2005. For example, the software, which may correspond to the example computer readable instructions 1100 of FIGS. 11, 12, 13, 14, 15, 16, 17, and/or 18, may be downloaded to the example processor platform 1900, which is to execute the computer readable instructions 1932 to implement the example vehicle prediction network

115 of FIG. 1. In some examples, one or more servers of the software distribution platform 2005 periodically offer, transmit, and/or force updates to the software (e.g., the example computer readable instructions 1932 of FIG. 19) to ensure improvements, patches, updates, etc. are distributed and applied to the software at the end user devices.

From the foregoing, it will be appreciated that example methods, apparatus and articles of manufacture have been disclosed for milestone prediction of fuel and chemical usage. The disclosed methods, apparatus and articles of manufacture improve the efficiency of using a computing device by utilizing historic data for a field and agriculture machine along with data obtained in substantially real time (e.g., aerial image data, machine sensor data, machine heading, field prescription information, etc.) to predict fuel consumption rate, distance to empty, time to empty, etc. for an agriculture machine. The disclosed methods, apparatus and articles of manufacture are accordingly directed to one or more improvement(s) in the functioning of a computer.

Example methods, apparatus, systems, and articles of manufacture for milestone prediction of fuel and chemical usage are disclosed herein. Further examples and combinations thereof include the following:

Example 1 includes an apparatus comprising one or more memories comprising computer readable instructions, one or more processors to execute the computer readable instructions to determine a current amount of fuel required without halt and a current fuel consumption rate for a machine during a harvesting event in a field based on a first amount of fuel required without halt, a first fuel consumption rate, and real time information from sensors of the machine, and determine a real time amount of fuel required based on the current amount of fuel required without halt, the current fuel consumption rate, and a halt time for the machine during the harvesting event, the one or more processors to use the real time amount of fuel required to schedule fuel delivery for the machine.

Example 2 includes the apparatus of example 1, wherein the one or more processors are to execute the computer readable instructions to obtain an aerial image of the field and determine field metrics from the aerial image, the field metrics including at least one of an area of the field, a total throughput of the field, and a number of turns in the field.

Example 3 includes the apparatus of example 2, wherein the one or more processors are to execute the computer readable instructions to determine the first amount of fuel required without halt and the first fuel consumption rate for the machine before the harvesting event based on historic field data and the field metrics determined based on the aerial image of the field.

Example 4 includes the apparatus of example 3, wherein the one or more processors are to execute the computer readable instructions to determine the first amount of fuel required without halt using a first machine learning model that is formed based on at least one of a total throughput of the field, field area, turn speed, turn radius, number of turns, or an engine load profile, and determine the first fuel consumption rate using a second machine learning model that is formed based on at least one of a status of machine aggregate connection and an engine load.

Example 5 includes the apparatus of example 1, wherein the real time information from the sensors of the machine include at least one of area covered, a number of turns executed, and a number of times a tank is unloaded.

Example 6 includes the apparatus of example 1, wherein the one or more processors are to execute the computer readable instructions to determine the current amount of fuel required without halt using a machine learning model that is formed based on at least one of a throughput of the field, field area covered, turn speed, number of turns executed, or a engine load profile collected in real time.

Example 7 includes the apparatus of example 1, wherein the one or more processors are to execute the computer readable instructions to determine the current fuel consumption rate using a machine learning model that is formed based on at least one of a status of a machine aggregate connection and an engine load profile collected in real time.

Example 8 includes the apparatus of example 1, wherein the one or more processors are to execute the computer readable instructions to store the current amount of fuel required without halt and the current fuel consumption rate as historic field data after the harvesting event is complete.

Example 9 includes an apparatus comprising one or more memories comprising computer readable instructions, one or more processors to execute the computer readable instructions to determine a type of an implement for a machine, obtain prescriptions for a material included in at least one of the implement of the machine or the machine, the one or more processors to obtain the prescriptions based on at least one of the type of the implement for the machine or a type of operation, the prescriptions to define at least one of a rate at which the implement of the machine releases the material or a rate of speed for the machine, and calculate at least one of a distance until empty or a time until empty for the material based on at least one of the type of the implement for the machine or type of the machine and the prescriptions for the material, the one or more processors to estimate milestones on a path for the machine based on the distance until empty or the time until empty.

Example 10 includes the apparatus of example 9, wherein the type of the implement including at least one of a slurry applicator, a planter, a seeder, a spraying implement, a spreading implement, or an implement with a defined operating width.

Example 11 includes the apparatus of example 9, wherein the prescriptions for the material of the implement or the prescriptions for the rate of speed change based on a geographical location of the machine.

Example 12 includes the apparatus of example 11, wherein the one or more processors are to execute the computer readable instructions to calculate the at least one of the distance until empty or the time until empty for the material based on the prescriptions for the material in a real time geographical location of the machine.

Example 13 includes the apparatus of example 9, wherein the one or more processors are to execute the computer readable instructions to determine the machine heading in real time.

Example 14 includes the apparatus of example 13, wherein the one or more processors are to execute the computer readable instructions to calculate the at least one of the distance until empty or the time until empty for the material based on prescriptions for the material for approaching geographical locations of the machine based on the machine heading.

Example 15 includes a non-transitory computer readable medium comprising instructions which, when executed, cause at least one processor to determine a current amount of fuel required without halt and a current fuel consumption rate for a machine during a harvesting event in a field based on a first amount of fuel required without halt, a first fuel consumption rate, and real time information from sensors of the machine, and determine a real time amount of fuel required based on the current amount of fuel required without halt, the current fuel consumption rate, and a halt time for the machine during the harvesting event, the at least one processor to use the real time amount of fuel required to schedule fuel delivery for the machine.

Example 16 includes the non-transitory computer readable medium of example 15, wherein the instructions, when executed, cause the at least one processor to obtain an aerial image of the field and determine field metrics from the aerial image, the field metrics including at least one of an area of the field, a total throughput of the field, and a number of turns in the field.

Example 17 includes the non-transitory computer readable medium of example 16, wherein the instructions, when executed, cause the at least one processor to determine the first amount of fuel required without halt and the first fuel consumption rate for the machine before the harvesting event based on historic field data and the field metrics determined based on the aerial image of the field.

Example 18 includes the non-transitory computer readable medium of example 17, wherein the instructions, when executed, cause the at least one processor to determine the first amount of fuel required without halt using a machine learning model that is formed based on at least one of a total throughput of the field, field area, turn speed, turn radius, number of turns, or an engine load profile, and determine the first fuel consumption rate using a second machine learning model that is formed based on at least one of a status of machine aggregate connection and an engine load.

Example 19 includes the non-transitory computer readable medium of example 15, wherein the instructions, when executed, cause the at least one processor to determine the current amount of fuel required without halt using a machine learning model that is formed based on at least one of a throughput of the field, field area covered, turn speed, number of turns executed, or a engine load profile collected in real time.

Example 20 includes the non-transitory computer readable medium of example 15, wherein the instructions, when executed, cause the at least one processor to determine the current fuel consumption rate using a machine learning model that is formed based on at least one of a status of machine aggregate connection and an engine load profile collected in real time.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising one or more processors to execute computer readable instructions to:
   determine a current amount of fuel required without halt and a current fuel consumption rate for a machine during a harvesting event in a field based on a first amount of fuel required without halt, a first fuel consumption rate, and real time information from sensors of the machine;
   determine a real time amount of fuel required based on the current amount of fuel required without halt, the current fuel consumption rate, and a halt time for the machine during the harvesting event, the one or more processors to use the real time amount of fuel required to schedule fuel delivery for the machine; and
   perform the harvesting event in the field based on the real time amount of fuel required and a navigation path of the machine.

2. The apparatus of claim 1, wherein the one or more processors are to execute the computer readable instructions to obtain an aerial image of the field and determine field metrics from the aerial image, the field metrics including at least one of an area of the field, a total throughput of the field, and a number of turns in the field.

3. The apparatus of claim 2, wherein the one or more processors are to execute the computer readable instructions to determine the first amount of fuel required without halt and the first fuel consumption rate for the machine before the harvesting event based on historic field data and the field metrics determined based on the aerial image of the field.

4. The apparatus of claim 3, wherein the one or more processors are to execute the computer readable instructions to:
   determine the first amount of fuel required without halt using a first machine learning model that is formed based on at least one of the total throughput of the field, the area of the field, a turn speed, a turn radius, the number of turns in the field, or an engine load profile; and
   determine the first fuel consumption rate using a second machine learning model that is formed based on at least one of a status of machine aggregate connection and an engine load.

5. The apparatus of claim 1, wherein the real time information from the sensors of the machine include at least one of an area of the field covered, a number of turns executed, and a number of times a tank is unloaded.

6. The apparatus of claim 1, wherein the one or more processors are to execute the computer readable instructions to determine the current amount of fuel required without halt using a machine learning model that is formed based on at least one of a throughput of the field, an area of the field covered, a turn speed, a number of turns executed, or an engine load profile collected in real time.

7. The apparatus of claim 1, wherein the one or more processors are to execute the computer readable instructions to determine the current fuel consumption rate using a machine learning model that is formed based on at least one of a status of a machine aggregate connection and an engine load profile collected in real time.

8. The apparatus of claim 1, wherein the one or more processors are to execute the computer readable instructions to store the current amount of fuel required without halt and the current fuel consumption rate as historic field data after the harvesting event is complete.

9. An apparatus comprising one or more processors to execute computer readable instructions to:
   determine a type of an implement for a machine;
   obtain prescriptions for a material included in at least one of the type of the implement of the machine or the machine, the one or more processors to obtain the prescriptions based on at least one of the type of the implement for the machine or a type of operation, the prescriptions to define at least one of a rate at which the type of the implement of the machine releases the material or a rate of speed for the machine;
   calculate at least one of a distance until empty or a time until empty for the material based on at least one of the type of the implement for the machine or a type of the machine and the prescriptions for the material, the one or more processors to estimate milestones on a path for the machine based on the distance until empty or the time until empty; and perform an operation using the implement for the machine, wherein performance of the operation is based on the estimated milestones.

10. The apparatus of claim 9, wherein the type of the implement includes at least one of a slurry applicator, a planter, a seeder, a spraying implement, a spreading implement, or an implement with a defined operating width.

11. The apparatus of claim 9, wherein the prescriptions for the material of the type of the implement or the prescriptions for the rate of speed change based on a geographical location of the machine.

12. The apparatus of claim 11, wherein the one or more processors are to execute the computer readable instructions to calculate the at least one of the distance until empty or the time until empty for the material based on the prescriptions for the material in a real time geographical location of the machine.

13. The apparatus of claim 9, wherein the one or more processors are to execute the computer readable instructions to determine machine heading in real time.

14. The apparatus of claim 13, wherein the one or more processors are to execute the computer readable instructions to calculate the at least one of the distance until empty or the time until empty for the material based on prescriptions for the material for approaching geographical locations of the machine based on the machine heading.

15. A non-transitory computer readable medium comprising instructions which, when executed, cause at least one processor to:

determine a current amount of fuel required without halt and a current fuel consumption rate for a machine during a harvesting event in a field based on a first amount of fuel required without halt, a first fuel consumption rate, and real time information from sensors of the machine;

determine a real time amount of fuel required based on the current amount of fuel required without halt, the current fuel consumption rate, and a halt time for the machine during the harvesting event, the at least one processor to use the real time amount of fuel required to schedule fuel delivery for the machine; and Perform the harvesting event in the field based on the real time amount of fuel required and a navigation path of the machine.

16. The non-transitory computer readable medium of claim 15, wherein the instructions, when executed, cause the at least one processor to obtain an aerial image of the field and determine field metrics from the aerial image, the field metrics including at least one of an area of the field, a total throughput of the field, and a number of turns in the field.

17. The non-transitory computer readable medium of claim 16, wherein the instructions, when executed, cause the at least one processor to determine the first amount of fuel required without halt and the first fuel consumption rate for the machine before the harvesting event based on historic field data and the field metrics determined based on the aerial image of the field.

18. The non-transitory computer readable medium of claim 17, wherein the instructions, when executed, cause the at least one processor to:

determine the first amount of fuel required without halt using a machine learning model that is formed based on at least one of the total throughput of the field, the area of the field, a turn speed, a turn radius, the number of turns in the field, or an engine load profile; and determine the first fuel consumption rate using a second machine learning model that is formed based on at least one of a status of machine aggregate connection and an engine load.

19. The non-transitory computer readable medium of claim 15, wherein the instructions, when executed, cause the at least one processor to determine the current amount of fuel required without halt using a machine learning model that is formed based on at least one of a throughput of the field, an area of the field covered, a turn speed, a number of turns executed, or an engine load profile collected in real time.

20. The non-transitory computer readable medium of claim 15, wherein the instructions, when executed, cause the at least one processor to determine the current fuel consumption rate using a machine learning model that is formed based on at least one of a status of machine aggregate connection and an engine load profile collected in real time.

* * * * *